(12) United States Patent
Takamiya et al.

(10) Patent No.: US 8,742,313 B2
(45) Date of Patent: Jun. 3, 2014

(54) SOLID-STATE IMAGING DEVICE AND METHOD OF ADJUSTING REFERENCE VOLTAGE

(75) Inventors: Kenichi Takamiya, Fukuoka (JP); Junji Toyomura, Nagasaki (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 13/200,937

(22) Filed: Oct. 5, 2011

(65) Prior Publication Data

US 2012/0119063 A1 May 17, 2012

(30) Foreign Application Priority Data

Nov. 15, 2010 (JP) ................................. 2010-254782

(51) Int. Cl.
*H01J 40/14* (2006.01)
*H01L 31/00* (2006.01)
*H04N 3/14* (2006.01)

(52) U.S. Cl.
USPC .................... 250/214 R; 250/214.1; 348/308; 348/309

(58) Field of Classification Search
USPC ..... 250/214 R, 214.1, 214 LS; 348/245, 266, 348/308, 309, 313, 332
See application file for complete search history.

(56) References Cited

U.S. PATENT DOCUMENTS 7,321,329 B2 * 1/2008 Tooyama et al. ............. 341/163

FOREIGN PATENT DOCUMENTS

JP 2009-124514 A 6/2009

* cited by examiner

*Primary Examiner* — Georgia Y Epps
*Assistant Examiner* — Don Williams
(74) *Attorney, Agent, or Firm* — Rader, Fishman & Grauer PLLC

(57) ABSTRACT

A solid-state imaging device includes: a pixel array unit that includes a plurality of pixels arranged two dimensionally and a plurality of read-out signal lines used for reading out pixel signals from the plurality of pixels; test voltage applying units that are disposed at the read-out signal lines and apply test voltages of various voltage levels to the read-out signal lines; a reference voltage generating circuit that includes a MOS transistor used for generating a reference voltage and can change an operating point of the MOS transistor; and an operating point control unit that controls a process of adjusting the operating point of the MOS transistor based on the test voltages and the reference voltage.

20 Claims, 15 Drawing Sheets

CONFIGURATION EXAMPLE OF CURRENT MIRROR CIRCUIT

CONFIGURATION EXAMPLE OF CURRENT MIRROR CIRCUIT

CONFIGURATION EXAMPLE OF REFERENCE SIGNAL GENERATING CIRCUIT

CONFIGURATION EXAMPLE OF REFERENCE SIGNAL GENERATING CIRCUIT

EXAMPLE OF BLOCK CONFIGURATION OF LOGIC CIRCUIT ACCORDING TO FIRST EMBODIMENT

EQUIVALENT IMAGE CIRCUIT OF REFERENCE SIGNAL
GENERATING CIRCUIT ACCORDING TO FIRST EMBODIMENT

CONFIGURATION EXAMPLE OF IMPLEMENTATION CIRCUIT OF REFERENCE SIGNAL GENERATING CIRCUIT ACCORDING TO FIRST EMBODIMENT

PRINCIPLE OF PROCESS OF ADJUSTING REFERENCE VOLTAGE RAMP

PRINCIPLE OF CALCULATING LINEARITY ERROR OF OUTPUT CODE

PRINCIPLE OF PROCESS OF ADJUSTING REFERENCE VOLTAGE RAMP

MANAGEMENT TABLE OF LINEARITY ERROR

| | REFERENCE VOLTAGE | | | 1/2 FULL CODE | | | FULL CODE |
|---|---|---|---|---|---|---|---|
| TEST VOLTAGE LEVEL | 0 | 1 | 2 | ---------- | 10 | ---------- | 18 | 19 | 20 |
| OUTPUT CODE | 0 | 94 | 187 | ---------- | 900 | ---------- | 1552 | 1676 | 1757 |
| IDEAL LINE | 0 | 90 | 180 | ---------- | 900 | ---------- | 1580 | 1710 | 1800 |
| LINEARITY ERROR | 0 | 4 | 7 | ---------- | 0 | ---------- | 28 | 34 | 43 |
| MAXIMUM LINEARITY ERROR | $\Delta 1=11$ (LOW ILLUMINANCE SIDE) | | | – | $\Delta 2=43$ (HIGH ILLUMINANCE SIDE) | | |

FLOWCHART OF PROCESS OF ADJUSTING OPERATING POINT

EQUIVALENT IMAGE CIRCUIT OF REFERENCE SIGNAL
GENERATING CIRCUIT ACCORDING TO SECOND EMBODIMENT

CONFIGURATION EXAMPLE OF IMPLEMENTATION CIRCUIT OF REFERENCE
SIGNAL GENERATING CIRCUIT ACCORDING TO SECOND EMBODIMENT

EXAMPLE OF BLOCK CONFIGURATION OF LOGIC CIRCUIT ACCORDING TO THIRD EMBODIMENT

CONFIGURATION EXAMPLE OF ADJUSTMENT VALUE TABLE OF OPERATING POINT

| INCLINATION LEVEL | 1 | 5 | 10 | 15 | 20 | 30 | 40 |
|---|---|---|---|---|---|---|---|
| OPERATING POINT ADJUSTING VALUE | 1 | 2 | 2 | 3 | 5 | 7 | 10 |

FLOWCHART OF PROCESS OF UPDATING ADJUSTMENT VALUE TABLE

CONFIGURATION EXAMPLE OF SOLID-STATE IMAGING DEVICE IN RELATED ART

SOLID-STATE IMAGING DEVICE AND METHOD OF ADJUSTING REFERENCE VOLTAGE

FIELD

The present disclosure relates to a solid-state imaging device and a method of adjusting the reference voltage thereof.

BACKGROUND

In the related art, as one type of solid-state imaging devices (image sensor), CMOS (Complementary Metal Oxide Semiconductor) type solid imaging devices are known. Generally, the CMOS-type solid-state imaging devices can be manufactured by using the same manufacturing process as that of CMOS-type integrated circuits. Accordingly, in the manufacturing process of the CMOS-type solid-state imaging devices, an analog circuit and a logic circuit can be manufactured inside the same chip.

Of such CMOS-type solid-state imaging devices, column parallel-type solid-imaging devices are used as mainstream devices in which pixel signals in a specific row are simultaneously read out in the column direction from a pixel array, in which pixels are two-dimensionally arranged, and a parallel process is performed. Regarding a processing circuit arranged on the signal output stage of the column parallel-type solid-state imaging device, various configurations are proposed in the related art (for example, see JP-A-2009-124514).

FIG. 18 schematically illustrates a block circuit configuration of a column parallel-type solid-state imaging device in the related art that is, for example, disclosed in JP-A-2009-124514 and the like.

The solid-state imaging device 300 includes: a pixel array unit 302 that is configured by arranging a plurality of pixels 301 in the row direction and the column direction in a matrix pattern; a row scanning circuit 303; a column scanning circuit 304; and a timing control circuit 305. In addition, the solid-state imaging device 300 includes a reference voltage generating circuit 306 (DAC: Digital to Analog Converter) and an ADC (Analog to Digital Converter) block 307. The ADC block 307 includes a comparator 311, a counter unit 312, and a latch circuit 313 that are disposed for each vertical signal line VSL.

In the solid-state imaging device 300 having the configuration illustrated in FIG. 18, the signal of a reference voltage RAMP output from the reference voltage generating circuit 306 has a waveform in which the voltage level decreases at a predetermined inclination (linear) with respect to time with a predetermined dynamic range (variation width). The voltage levels of the reference voltage RAMP and the pixel signal readout from each vertical signal line VSL are compared with each other by the comparator 311, and a time (comparison time) until both signals intersect is measured by the counter unit 312. Then, the comparison time (counted number) acquired from the counter unit 312 is maintained in the latch circuit 313 and then is output through a horizontal output line 314. Thereafter, the output counted number is converted into a corresponding output code (digital signal).

In addition, in JP-A-2009-124514, the comparator 311 is proposed in which a first amplifier and a second amplifier, which are cascode-connected, and a mirror circuit disposed in parallel with the second amplifier are arranged. Furthermore, in JP-A-2009-124514, in a mirror circuit, a technique is proposed in which, in order to determine the operating point for each column at the time of starting a row operation, a voltage that is initialized and sampled is input to the gate. In JP-A-2009-124514, the mirror circuit is controlled by detecting the output level of the second amplifier, thereby suppressing a change in the analog power source.

SUMMARY

However, recently, in the above-described CMOS-type solid-state imaging devices, implementation of low-power consumption has advanced, and low-voltage implementation of a used source power has advanced. In a case where the low-voltage implementation of the source voltage is made, it is difficult to secure a sufficient voltage margin for a MOS transistor that is used in a processing circuit on the signal output stage of the CMOS-type imaging device. Generally, the MOS transistor is designed such that the operating point thereof is in the saturation region. However, in a case where the voltage margin is small, the operating point may easily deviate from the saturation region so as to enter the linear region, for example, due to the influence of variations of devices, a change in the power source and a change in the temperature at the time of use, or the like.

Particularly, in the reference voltage generating circuit that generates a reference voltage RAMP, in a case where the operating point of an internal MOS transistor deviates in accordance with the low-voltage implementation of the source voltage, there is a problem in that it is difficult to acquire a reference voltage RAMP having a predetermined inclination and a predetermined dynamic range. In addition, in a case where the operating point of the MOS transistor deviates in the reference voltage generating circuit, the waveform of the reference voltage RAMP has a curved shape, and, there is also a case where it is difficult to secure the linearity of the voltage level of the reference voltage RAMP with respect to time.

As described above, in a case where it is difficult to acquire the reference voltage RAMP having a desired waveform from the reference voltage generating circuit, the accuracy at the time of converting a read-out pixel signal from analog to digital is lowered. In JP-A-2009-124514 described above, the problem of the collapse of the waveform of the reference voltage RAMP that occurs in accordance with the low-voltage implementation of the source voltage is not sufficiently considered.

Thus, it is desirable to provide a solid-state imaging device and a method of adjusting a reference voltage that are capable of generating a reference voltage RAMP having a desired waveform even in a case where the low-voltage implementation of a source voltage is made.

An embodiment of the present disclosure is directed to a solid-state imaging device configured by a pixel array unit, test voltage applying units, a reference voltage generating circuit, and an operating point control unit. The configuration and the function of each unit are as follows. The pixel array unit includes a plurality of pixels arranged two dimensionally and a plurality of read-out signal lines used for reading out pixel signals from the plurality of pixels. The test voltage applying units are disposed at the read-out signal lines and apply test voltages of various voltage levels to the read-out signal lines. The reference voltage generating circuit includes a MOS transistor used for generating a reference voltage and can change an operating point of the MOS transistor. In addition, the operating point control unit controls a process of adjusting the operating point of the MOS transistor based on the test voltages and the reference voltage.

Another embodiment of the present disclosure is directed to a method of adjusting a reference voltage. The method performs the following sequence. First, the test voltage applying units apply test voltages of various voltage levels to readout signal lines. Thereafter, an operation point control unit controls the process of adjusting the operating point of the MOS transistor based on the test voltage and the reference voltage.

As described above, according to the embodiments of the present disclosure, the reference voltage generating circuit is configured such that the operating point of the internal MOS transistor can be changed. Then, when test voltages of various voltage levels are read out from the test voltage applying units and are applied to signal lines, the operating point of the MOS transistor is adjusted based on the test voltage and the reference voltage. Therefore, according to the embodiments of the present disclosure, even when the operating point of the MOS transistor arranged inside the reference voltage generating circuit deviates, the operating point can be appropriately adjusted to an optimal position. Accordingly, even in a case where the low-voltage implementation of the source voltage is made, a reference voltage RAMP having a desired waveform can be generated.

DETAILED DESCRIPTION

Hereinafter, examples of solid-state imaging devices and techniques of adjusting a reference voltage RAMP according to various embodiments of the present disclosure will be described with reference to the accompanying drawings in the following order. However, the present disclosure is not limited to the following examples.

1. Problems occurring in accordance with low-voltage implementation of source voltage
2. First Embodiment: Example of configuration in which size of MOS transistor arranged inside reference voltage generating circuit is adjusted
3. Second Embodiment: Example of configuration in which back-bias voltage applied to MOS transistor arranged inside reference voltage generating circuit is adjusted
4. Third Embodiment: Example of configuration in which inclination of waveform of reference voltage RAMP is variable
5. Various Modified Examples 1. Problems Occurring in Accordance with Low-Voltage Implementation of Source Voltage First, before the configurations of solid-state imaging devices according to various embodiments are described, problems in a reference voltage generating circuit that occur in accordance with the low-voltage implementation of a source voltage will be described in more detail.

[Current Mirror Circuit]

Figure 1:
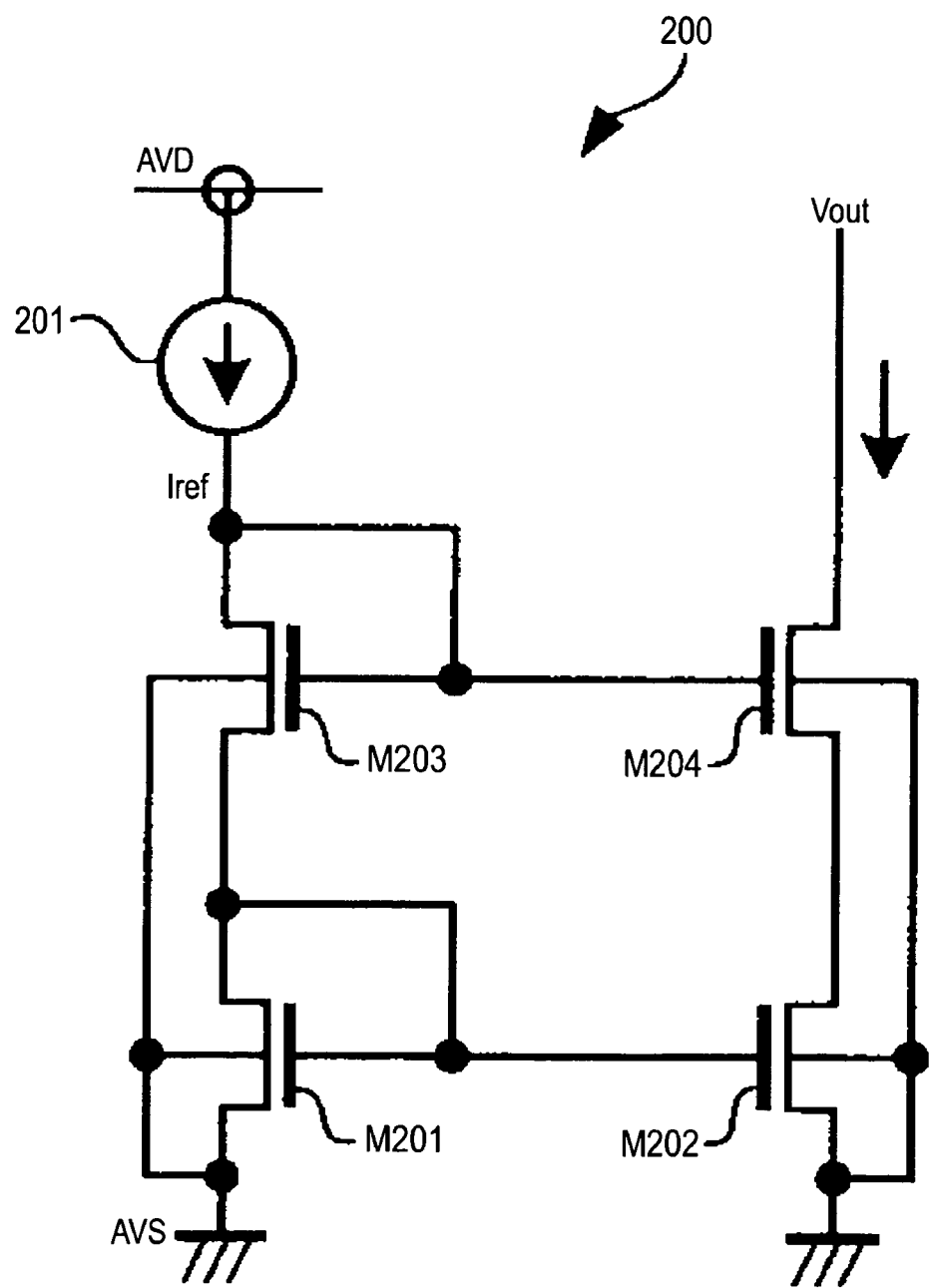
FIG. 1 is a diagram illustrating the circuit configuration of a current mirror circuit.

Inside a reference voltage generating circuit of a solid-state imaging device, a current mirror circuit that is configured by MOS transistors is used. FIG. 1 illustrates the circuit configuration of a current mirror circuit. In FIG. 1, the current mirror circuit 200 having a cascode configuration is illustrated.

The current mirror circuit 200 includes a reference current source 201 and a first NMOS (Negative-channel MOS) transistor M201 to a fourth NMOS transistor M204. The connection relation between the circuit elements is as follows.

The current inflow-side terminal of the reference current source 201 is connected to the supply terminal of a source voltage AVD, and the current outflow-side of the reference current source 201 is connected to the drain terminal of the third NMOS transistor M203.

The gate terminal of the third NMOS transistor M203 is connected to the gate terminal of the fourth NMOS transistor M204, and the source terminal of the third NMOS transistor M203 is connected to the drain terminal of the first NMOS transistor M201. In addition, the gate terminal of the third NMOS transistor M203 is connected to the drain terminal thereof. In other words, the third NMOS transistor M203 forms a diode connection. Furthermore, the back-bias terminal (body terminal) of the third NMOS transistor M203 is grounded (ground voltage AVS).

The gate terminal of the first NMOS transistor M201 is connected to the gate terminal of the second NMOS transistor M202, and the source terminal of the first NMOS transistor M201 is grounded. In addition, the gate terminal of the first NMOS transistor M201 is connected to the drain terminal thereof (diode connection). Furthermore, the back-bias terminal of the first NMOS transistor M201 is grounded.

The drain terminal of the second NMOS transistor M202 is connected to the source terminal of the fourth NMOS transistor M204, and the source terminal of the second NMOS transistor M202 is grounded. In addition, the back-bias terminal of the second NMOS transistor M202 is grounded.

The drain terminal of the fourth NMOS transistor M204 is connected to the terminal of an output voltage Vout. In addition, the back-bias terminal of the fourth NMOS transistor M204 is grounded.

In the current mirror circuit 200, the first NMOS transistor M201 monitors a reference current Iref flowing therethrough. In addition, to the second NMOS transistor M202, a current that is acquired by dividing the reference current Iref in proportion to the size ratio between the first NMOS transistor M201 and the second NMOS transistor M202 is copied. In other words, a current acquired by integrating the reference current Iref at the size ratio between the first NMOS transistor M201 and the second NMOS transistor M202 flows through the second NMOS transistor M202.

In the current mirror circuit 200 having the cascode configuration, for example, in a case where the source voltage AVD is low, a case where the threshold voltage of each NMOS transistor is high, or the like, it is difficult to maintain (secure) the operating point of each NMOS transistor in a saturation region. In addition, various kinds of techniques for securing the operating point of the NMOS transistor are reviewed in the related art.

[Reference Voltage Generating Circuit]

Figure 2:
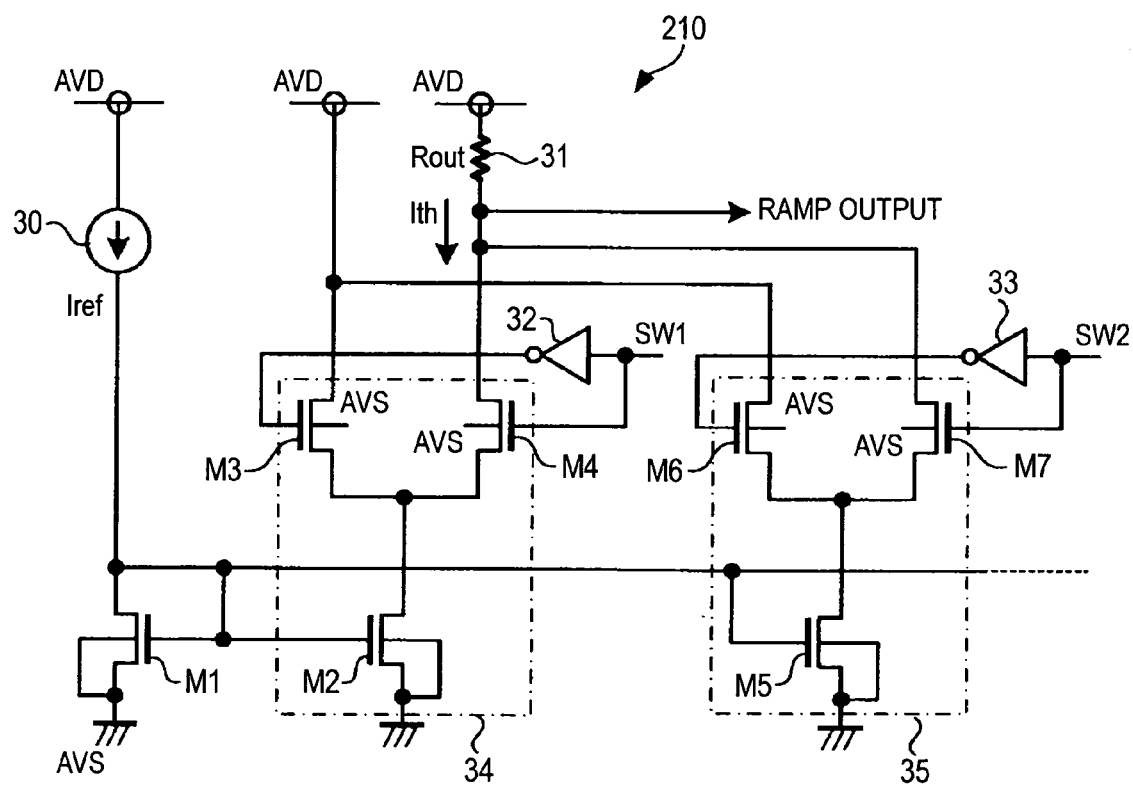
FIG. 2 is a diagram illustrating the circuit configuration of a reference voltage generating circuit (DAC).

FIG. 2 illustrates the circuit configuration of the output stage of the reference voltage generating circuit that generates a reference voltage RAMP. In FIG. 2, for simplification of the description, only two current sources (a first current source 34 and a second current source 35 to be described later) are represented. Actually, even more current sources are connected in parallel.

The reference voltage generating circuit 210 includes a reference current source 30, an output resistor 31, a first NOT circuit 32, a second NOT circuit 33, and a first NMOS transistor M1 to a seventh NMOS transistor M7. The connection relation between the circuit elements is as follows.

The current inflow-side terminal of the reference current source 30 is connected to the supply terminal of the source voltage AVD, and the current outflow-side of the reference current source 30 is connected to the drain terminal of the first NMOS transistor M1.

The gate terminal of the first NMOS transistor M1 is connected to the gate terminals of the second NMOS transistor M2 and the fifth NMOS transistor M5, and the source terminal of the first NMOS transistor M1 is grounded (the ground voltage AVS). In addition, the gate terminal of the first NMOS transistor M1 is connected to the drain terminal thereof (diode connection). Furthermore, the back-bias terminal (body terminal) of the first NMOS transistor M1 is grounded.

The drain terminal of the second NMOS transistor M2 is connected to the source terminals of the third NMOS transistor M3 and the fourth NMOS transistor M4, and the source terminal of the second NMOS transistor M2 is grounded. In addition, the back-bias terminal of the second NMOS transistor M2 is grounded.

The drain terminal of the third NMOS transistor M3 is connected to the supply terminal of the source voltage AVD, and the gate terminal of the third NMOS transistor M3 is connected to the output terminal of the first NOT circuit 32. In addition, the input terminal of the first NOT circuit 32 is connected to the supply terminal (not illustrated in the figure) of the first switch control signal SW1. In other words, the third NMOS transistor M3 is controlled to be On/Off in accordance with a reverse-phase (inverted) signal of the first switch control signal SW1. In addition, the back-bias terminal of the third NMOS transistor M3 is grounded.

The drain terminal of the fourth NMOS transistor M4 is connected to the output terminal of the reference voltage RAMP and one terminal of the output resistor 31 (resistance value Rout). In addition, the other terminal of the output resistor 31 is connected to the supply terminal of the source voltage AVD. In addition, the gate terminal of the fourth NMOS transistor M4 is connected to the supply terminal of the first switch control signal SW1. In other words, the fourth NMOS transistor M4 is controlled to be On/Off in accordance with the first switch control signal SW1. In addition, the back-bias terminal of the fourth NMOS transistor M4 is grounded.

The drain terminal of the fifth NMOS transistor M5 is connected to the source terminals of the sixth NMOS transistor M6 and the seventh NMOS transistor M7, and the source terminal of the fifth NMOS transistor M5 is grounded. In addition, the back-bias terminal of the fifth NMOS transistor M5 is grounded.

The drain terminal of the sixth NMOS transistor M6 is connected to the supply terminal of the source voltage AVD, and the gate terminal of the sixth NMOS transistor M6 is connected to the output terminal of the second NOT circuit 33. In addition, the input terminal of the second NOT circuit 33 is connected to the supply terminal (not illustrated in the figure) of a second switch control signal SW2. In other words, the sixth NMOS transistor M6 is controlled to be On/Off in accordance with a reverse-phase (inverted) signal of the second switch control signal SW2. In addition, the back-bias terminal of the sixth NMOS transistor M6 is grounded.

The drain terminal of the seventh NMOS transistor M7 is connected to the output terminal of the reference voltage RAMP and one terminal of the output resistor 31. In addition, the gate terminal of the seventh NMOS transistor M7 is connected to the supply terminal of the second switch control signal SW2. In other words, the seventh NMOS transistor M7 is controlled to be On/Off in accordance with the second switch control signal SW2. In addition, the back-bias terminal of the seventh NMOS transistor M7 is grounded.

In the reference voltage generating circuit 210 illustrated in FIG. 2, a current mirror circuit is configured among the first NMOS transistor M1, the second NMOS transistor M2, and the fifth NMOS transistor M5.

Here, a circuit part (a circuit part surrounded by a dashed-dotted line illustrated in FIG. 2) that is configured by the second NMOS transistor M2 to the fourth NMOS transistor M4 is referred to as a first current source 34. In addition, a circuit part that is configured by the fifth NMOS transistor M5 to the seventh NMOS transistor M7 is referred to as a second current source 35.

In addition, although each current source is controlled to be On/Off in accordance with corresponding switch control signals (SW1 and SW2), hereinafter, in each current source, a state in which the NMOS transistor connected to the output resistor 31 is turned on is referred to as the On state of the current source. In other words, a state in which a current flows through the output resistor 31, and an IR drop occurs in the output resistor 31 (a state in which the reference voltage RAMP is output) is referred to as the On state of the current source. In addition, for example, in a case where the first current source 34 is in the On state, a current flows from the fourth NMOS transistor M4 to the second NMOS transistor M2. At this time, the amount of the current flowing inside the first current source 34 is the amount of a current that is acquired by integrating the reference current Iref at the size ratio between the first NMOS transistor M1 and the second NMOS transistor M2.

On the other hand, in each current source, a state in which the NMOS transistor directly connected to the supply terminal of the source voltage AVD is in the On state, and a current does not flow through the output resistor 31 is referred to as the Off state of the current source. In addition, for example, in a case where the first current source 34 is in the Off state, a current flows from the third NMOS transistor M3 to the second NMOS transistor M2. In this embodiment, as described above, a current flows through the current source at time other than when the reference voltage RAMP is output. The reason for this is for further reducing the variation in the characteristics of the current source by reducing the variation in the amount of the current flowing through the current source before and after being switched to a RAMP output mode.

Next, the operation of the reference voltage generating circuit 210 illustrated in FIG. 2 will be briefly described. First, a case will be considered in which all the current sources are in the Off state. In such a case, an IR drop does not occur in the output resistor 31, and accordingly, the reference voltage RAMP of a maximum voltage level (AVD) is output.

Thereafter, after a predetermined time, the first current source 34 is allowed to be in the On state. Accordingly, inside the first current source 34, a current flows from the fourth NMOS transistor M4 to the second NMOS transistor M2, and an IR drop occurs in the output resistor 31. As a result, the voltage level of the reference voltage RAMP that is output from the reference voltage generating circuit 210 is lowered.

Thereafter, further after a predetermined time elapses, the second current source 35 is allowed to be in the On state in the state in which the first current source 34 is in the On state. As a result, the amount of the current flowing through the output resistor 31 further increases, and the voltage level of the reference voltage RAMP is further lowered. Thereafter, every predetermined time, the other current sources are sequentially allowed to be in the On state, whereby the output voltage level of the reference voltage RAMP linearly decreases with time. Accordingly, the reference voltage RAMP of a waveform, which is lowered at a predetermined inclination with respect to time, having a voltage level decreasing in a predetermined dynamic range is generated and output by the reference voltage generating circuit 210.

[Overview of Design of Reference Voltage Generating Circuit]

Here, an overview of the design of each NMOS transistor arranged inside the reference voltage generating circuit 210 will be described. Here, an overview of the design of the first NMOS transistor M1 arranged inside the reference voltage generating circuit 210 and each NMOS transistor arranged inside the first current source 34 will be mainly described. In addition, the other current sources are designed similarly to the first current source 34.

An important point in designing each NMOS transistor arranged inside the first current source 34 is that the second NMOS transistor M2 is typically operated in the saturation region (the operating point is located in the saturation region). The reason for this is as follows.

Since the first NMOS transistor M1 that becomes the monitoring side of a current Ith flowing through the second NMOS transistor M2, as described above, forms a diode connection, the first NMOS transistor M1 is typically operated in the saturation region. In such a case, when the second NMOS transistor M2 is operated not in the saturation region but in the linear region, the amount of the current that is copied to (flows through) the second NMOS transistor M2 deviates from a desired amount of the current, whereby it is difficult to acquire a desired reference voltage RAMP. Accordingly, in the reference voltage generating circuit 210, it is necessary to typically operate the second NMOS transistor M2 in the saturation region.

In addition, the third NMOS transistor M3 and the fourth NMOS transistor M4 not only serves as a control switch of the first current source 34 but also serves as a cascode for the second NMOS transistor M2. Accordingly, in order to design the reference voltage generating circuit 210, it is necessary to design the third NMOS transistor M3 and the fourth NMOS transistor M4 to be operated in the saturation region as well.

A specific design technique used for the first NMOS transistor M1 to the fourth NMOS transistor M4 for satisfying the above-described condition is as follows.

First, the size (channel size) of each one of the first NMOS transistor M1 and the second NMOS transistor M2 is determined such that an overdrive voltage Vdsat (=Vgs−Vth) is sufficiently high. Here, Vgs is a gate-to-source voltage of each NMOS transistor, and Vth is a threshold value of each NMOS transistor. Generally, for example, it is preferable that the overdrive voltage Vdsat is secured as about 100 mV.

However, when the sizes of the first NMOS transistor M1 and the second NMOS transistor M2 are determined in consideration of the overdrive voltage Vdsat, it is necessary to consider unevenness due to the manufacturing process. For example, in a case where a reference current that becomes the base of the reference current Iref is generated by using a polysilicon resistor or the like, there is a possibility that unevenness of about ±20% occurs in the reference current Iref. In addition, for example, unevenness of about 100 mV occurs in the threshold voltage Vth of each transistor depending on a used process. Accordingly, when the first NMOS transistor M1 and the second NMOS transistor M2 are designed, it is necessary to check the overdrive voltage Vdsat that can be secured under all the conditions.

However, it is difficult to check the overdrive voltage Vdsat under all the conditions. Actually, first, the sizes of the first NMOS transistor M1 and the second NMOS transistor M2 are determined under a strictest condition. More specifically, the sizes of the first NMOS transistor M1 and the second NMOS transistor M2 are designed under the condition that the value of the reference current Iref is small, and the threshold value Vth is low, so that a sufficient overdrive voltage Vdsat can be secured. Accordingly, it is possible to acquire a sufficient overdrive voltage Vdsat in the first NMOS transistor M1 and the second NMOS transistor M2 under all the other conditions.

Next, the sizes of the third NMOS transistor M3 and the fourth NMOS transistor M4 are designed, and the design thereof is performed similarly to that of the first NMOS transistor M1 and the second NMOS transistor M2. In other words, the sizes of the third NMOS transistor M3 and the fourth NMOS transistor M4 are designed under a condition that the value of the reference current Iref is small, and the threshold voltage Vth is low, so that a sufficient overdrive voltage Vdsat can be acquired.

However, at this time, the sizes of the NMOS transistors are adjusted such that overdrive voltages Vdsat of the third NMOS transistor M3 and the fourth NMOS transistor M4 are in the same level as that of the second NMOS transistor M2. As a result of the design performed under the above-described condition, in a case where it is difficult to operate the second NMOS transistor M2 and the fourth NMOS transistor M4 in the saturation region, the design specification is reconsidered.

Next, in each NMOS transistor designed under the above-described condition, it is checked whether or not each NMOS transistor is operated in the saturation region under a condition opposite to the above-described condition, in other words, under a condition in which the value of the reference current Iref is large, and the threshold voltage Vth is high. In a case where it is checked that each NMOS transistor is operated in the saturation region under even such a condition, there is no problem in the operating point of each NMOS transistor in the above-described design.

In addition, in the above-described process of checking the operation of each NMOS transistor, it is checked whether or not each one of the second NMOS transistor M2 and the fourth NMOS transistor M4 satisfies a saturation criterion formula of the NMOS transistor Vds−Vdsat>0. Here, Vds is a drain-to-source voltage of each NMOS transistor.

In a case where the reference current Iref increases, and the threshold voltage Vth of each NMOS transistor becomes higher, the overdrive voltage Vdsat is higher than that under a condition that the value of the reference current Iref is small, and the threshold voltage Vth of each NMOS transistor is low. Accordingly, under the condition that the value of the reference current Iref is large, and the threshold voltage Vth of each NMOS transistor is high, in order to satisfy the above-described saturation criterion formula, it is important that a voltage margin of some degree is secured in the voltage Vds of each NMOS transistor.

[Effect of Low Voltage Implementation of Source Voltage]

In the reference voltage generating circuit 210, as described above, the size of each NMOS transistor is determined. In the reference voltage generating circuit 210, in a case where the voltage margin for each NMOS transistor can be sufficiently secured by the above-described design, in order to further increase the accuracy, the cascode configuration (FIG. 2) may be employed.

However, when the low voltage implementation of the source voltage is made, even in a case where the NMOS transistors arranged inside the reference voltage generating circuit 210 are designed as described above, the voltage margin decreases. Accordingly, in such a case, it is difficult to secure the operation of each NMOS transistor in the saturation region, for example, due to the influence of a power source variation, a temperature variation, or the like at the time of use. More specifically, the following problems occur.
(1) When the source voltage AVD supplied to the drain terminal side of the fourth NMOS transistor M4 decreases, it is difficult to secure the operation of the fourth NMOS transistor M4 in the saturation region.
(2) When a source voltage DVD supplied to the gate terminal side of the fourth NMOS transistor M4 decreases, it is difficult to secure the operation of the second NMOS transistor M2 in the saturation region.

Figure 3:
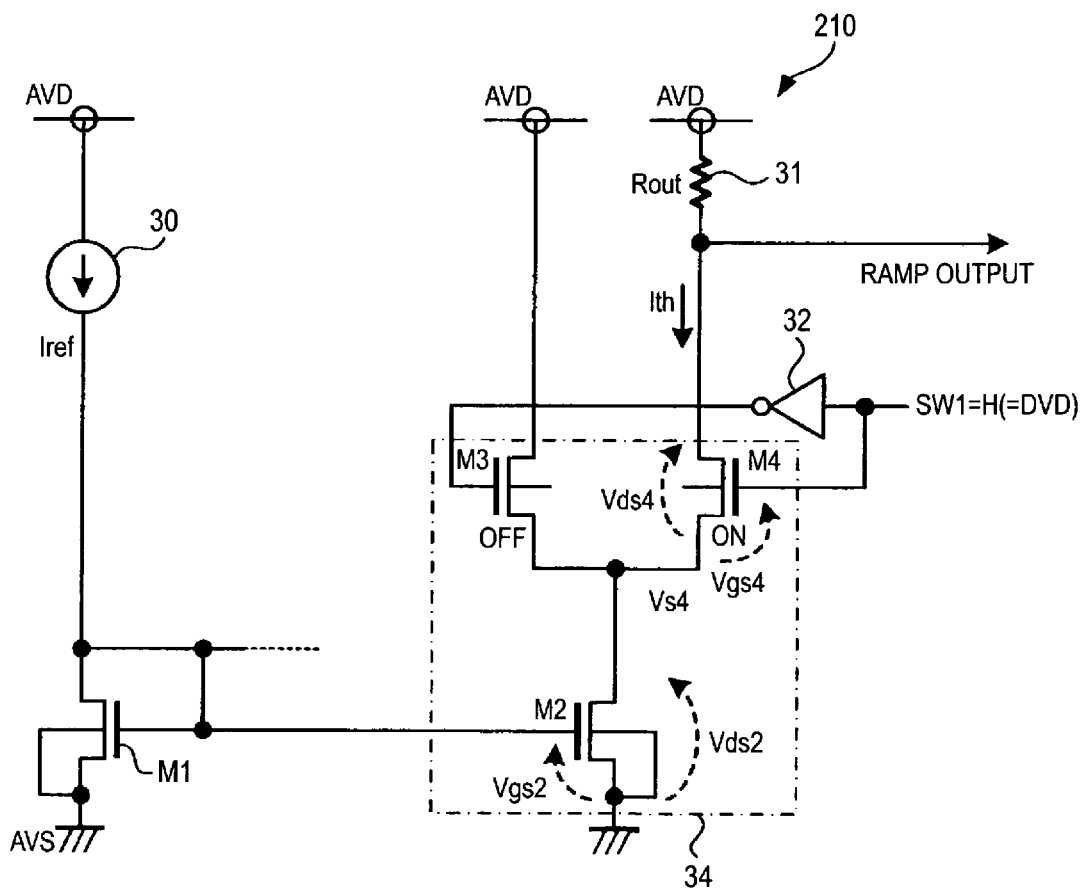
FIG. 3 is a diagram illustrating problems that occur in accordance with low-voltage implementation of a source voltage.

The problems represented in (1) and (2) described above will be described in more detail with reference to FIG. 3. FIG. 3 represents a state in which the first switch control signal SW1 used for controlling the first current source 34 is set to a "H (High) level, and the current Ith flows through the fourth NMOS transistor M4, that is, the appearance of the operation when the first current source 34 is in the On state. In FIG. 3, for simplification of the description, an example is illustrated in which only the first current source 34 is in the On state, and the other current sources are not illustrated.

First, the problem of (1) represented above will be described. When the source voltage AVD supplied to the drain terminal of the fourth NMOS transistor M4 is lowered, it is difficult to secure a sufficient value of the drain-to-source voltage Vds4 of the fourth NMOS transistor M4. In such a case, it is difficult to satisfy the above-described saturation criterion formula (Vds−Vdsat>0) in the fourth NMOS transistor M4, and the operating point of the fourth NMOS transistor M4 may easily deviate from the saturation region and enter the linear region.

When the operating point of the fourth NMOS transistor M4 enters the linear region, the fourth NMOS transistor M4 serves similarly to a resistor. In such a case, the drain-to-source voltage Vds2 of the second NMOS transistor changes in accordance with a change in the reference voltage RAMP with respect to time, and as a result, the linearity of the reference voltage RAMP deteriorates.

In addition, the drain-to-source voltage Vds4 of the fourth NMOS transistor M4 is greatly influenced by the amount of the IR drop in the output resistor 31, that is, the dynamic range of the reference voltage RAMP. Accordingly, in a case where it is necessary to set the dynamic range of the reference voltage RAMP to be large, it becomes more difficult to secure a sufficient value of the drain-to-source voltage Vds4 of the fourth NMOS transistor M4.

Next, the problem of (2) represented above will be described. In a case where the second NMOS transistor M2 and the fourth NMOS transistor M4 are operated in the saturation region, the gate-to-source voltage Vgs4 of the fourth NMOS transistor M4 is determined by the current Ith flowing through the second NMOS transistor M2. In addition, the drain-to-source voltage Vds2 of the second NMOS transistor M2 is determined by a difference (DVD−Vgs4) between the source voltage DVD applied to the gate terminal of the fourth NMOS transistor M4 and the gate-to-source voltage Vgs4 of the fourth NMOS transistor M4.

However, the current Ith is determined by the gate-to-source voltage Vgs2 of the second NMOS transistor M2, and, in a case where two-channel length modulation is ignored, the current Ith does not depend on the drain-to-source voltage Vds2 of the second NMOS transistor M2. Accordingly, when the source voltage DVD decreases, it is difficult to acquire a sufficient value of the drain-to-source voltage Vds2 (=DVD−Vgs4) of the second NMOS transistor M2.

In such a case, it is difficult to satisfy the above-described saturation criterion formula (Vds−Vdsat>0) in the second NMOS transistor M2, and the operating point of the second NMOS transistor M2 may easily deviate from the saturation region and enter the linear region. When the operating point of the second NMOS transistor M2 enters the linear region, the current Ith that is copied to the second NMOS transistor M2 is not a desired value, and the dynamic range of the reference voltage RAMP varies in a large range.

In addition, the second NMOS transistor M2 serves similarly to a resistor. Accordingly, an electric potential Vs4 between the second NMOS transistor M2 and the fourth NMOS transistor M4 is an electric potential acquired by balancing the drain-to-source voltage Vds2 of the second NMOS transistor M2 and the gate-to-source voltage Vgs4 of the fourth NMOS transistor M4.

As described above, in the configuration of the reference voltage generating circuit 210 illustrated in FIG. 2, as the low voltage implementation of various source voltages is made, it is difficult to secure the operating point of each NMOS transistor in the saturation region. Then, when the operating point of each NMOS transistor deviates from the saturation region, as described above, the linearity of the reference voltage RAMP is weakened, or the dynamic range varies.

Generally, a product (solid-state imaging device) of which the operating point deviates as described above is excluded in a sorting step. Thus, in a case where it is difficult to restrict the specification of a source voltage or the like, the number of products of which the operating points deviate increases, and the yield ratio of products decreases. As a result, there is a problem in that the cost of the product (solid-state imaging device) increases.

In addition, in a solid-state imaging device in which the inclination of the reference voltage RAMP can be changed, the inclination of the reference voltage RAMP is changed by adjusting the amount of the reference current Iref by a block (not illustrated in the figure) arranged in the previous stage. In such a case, when the range in which the reference current Iref can be changed is broadened, the variation range of the inclination of the reference voltage RAMP increases, whereby it becomes more difficult to secure the operating point of each NMOS transistor.

2. First Embodiment

As described above, in a case where the operating point of each NMOS transistor arranged inside the reference voltage generating circuit deviates from the saturation region due to variations in the manufacturing process or factors such as a change in the power supply and a change in the temperature at the time of use, it is difficult to acquire a desired reference voltage RAMP. Thus, in a solid-state imaging device according to a first embodiment, a reference voltage generating circuit is configured by a size-variable NMOS transistor (a size-variable NMOS transistor to be described later). Then, in a case where it is difficult to acquire the desired reference voltage RAMP due to the above-described factors, the operating point is secured by adjusting the size of each size-variable NMOS transistor (MOS transistor) arranged inside the reference voltage generating circuit.

[Configuration of Solid-State Imaging Device]

Figure 4:
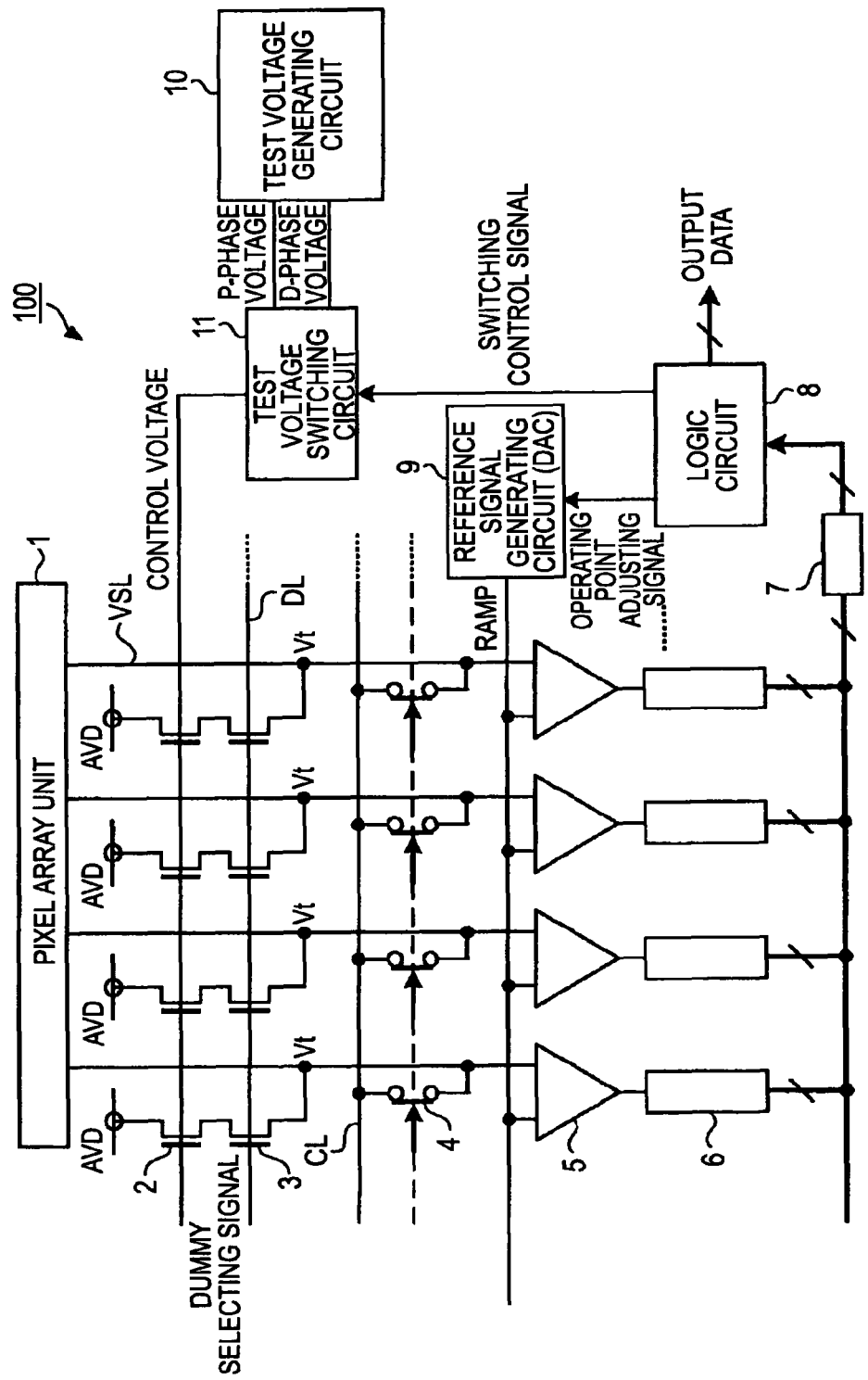
FIG. 4 is a schematic block diagram illustrating the configuration of a solid-state imaging device according to a first embodiment.

First, the configuration of a solid-state imaging device according to this embodiment will be described. FIG. 4 illustrates the circuit configuration of a solid-state imaging device according to this embodiment near a signal output stage. In addition, in this embodiment, as the solid-state imaging device, a column parallel-type CMOS image sensor will be described as an example. In FIG. 4, for simplification of the description, mainly, only a circuit portion relating to a process of adjusting the reference voltage RAMP, that is, a process of adjusting the size (operating point) of each NMOS transistor arranged inside the reference voltage generating circuit is represented.

The solid-state imaging device 100 includes a pixel array unit 1 that is configured by arranging a plurality of pixels (not illustrated in the figure) in the row direction and the column direction in a matrix pattern (two-dimensional pattern) and vertical signal lines VSL (read-out signal lines) that are disposed for each column of the pixel array unit 1.

In addition, the solid-state imaging device 100 includes dummy pixels 2 (test voltage applying units), selection transistors 3, vertical signal line lateral connection switches 4 (vertical signal line connection switches), comparators 5, and counters 6. Here, the dummy pixel 2, the selection transistor 3, the vertical signal line lateral connection switch 4, the comparator 5, and the counter 6 are disposed for each vertical signal line VSL and are arranged in the mentioned order from the pixel array unit 1 side.

Furthermore, the solid-state imaging device 100 includes a sense amplifier 7, a logic circuit 8 (operating point control unit), a reference voltage generating circuit 9, a test voltage generating circuit 10 (voltage generating circuit), and a test voltage switching circuit 11 (control voltage switching unit).

The dummy pixel 2 is configured by an NMOS transistor. The drain terminal of the dummy pixel 2 is connected to the supply terminal of the source voltage AVD, and the source terminal of the dummy pixel 2 is connected to the drain terminal of the selection transistor 3. In addition, the gate terminal of the dummy pixel 2 is connected to the test voltage generating circuit 10 through the test voltage switching circuit 11.

In addition, the dummy pixel 2 is not a switching element but operates as an amplifier circuit (amplifier) and applies (outputs) a test voltage Vt corresponding to an electric potential (control voltage) applied to the gate terminal to the vertical signal line VSL through the selection transistor 3.

The selection transistor 3 is configured by an NMOS transistor and is disposed between the dummy pixel 2 and the vertical signal line VSL. The drain terminal of the selection transistor 3 is connected to the source terminal of the dummy pixel 2, and the source terminal of the selection transistor 3 is connected to the vertical signal line VSL. In addition, the gate terminal of the selection transistor 3 is connected to a dummy pixel selecting line DL.

In addition, when a dummy selecting signal of a high level is applied to the gate of the selection transistor 3 through the dummy pixel selecting line DL, the selection transistor is in the On state, and whereby the dummy pixel 2 is in the selected state. Then, in the selected state, the selection transistor 3 relays the test voltage Vt output from the dummy pixel 2 to the vertical signal line VSL.

The vertical signal line lateral connection switch 4 is a switch that is in the On state at the time of adjusting the reference voltage RAMP and is in the Off state at the other time (for example, at the time when an ordinary image taking operation is performed). In addition, one terminal of the vertical signal line lateral connection switch 4 is connected to a corresponding vertical signal line VSL, and the other terminal of the vertical signal line lateral connection switch 4 is connected to a lateral connection line CL.

The reason for arranging the vertical signal line lateral connection switch 4 is as follows. The value of the test voltage Vt applied to the vertical signal line VSL from the dummy pixel 2 varies for each vertical signal line VSL due to a variation in the dummy pixel 2. As a result, an inter-column error occurs in the test voltage Vt that is applied to the vertical signal line VSL, and whereby the adjustment accuracy of the reference voltage RAMP decreases.

In this embodiment, in order to suppress the effect of the variation in the dummy pixel 2, when the reference voltage RAMP is adjusted, all the vertical signal line lateral connection switches 4 are allowed to be in the On state, and all the vertical signal lines VSL are connected together. Accordingly, the electric potential (the test voltage Vt) of each vertical signal line VSL is averaged to be the same electric potential, whereby the problem of the inter-column error can be suppressed.

One input terminal of the comparator 5 is connected to the vertical signal line VSL, and the other input terminal thereof is connected to the reference voltage generating circuit 9. The comparator 5 compares the reference voltage RAMP input from the reference voltage generating circuit 9 with an output voltage applied to the vertical signal line VSL from a pixel (not illustrated in the figure) or the dummy pixel 2. In addition, the output terminal of the comparator 5 is connected to the counter 6, and the comparator 5 outputs a result of the comparison process to the counter 6.

The counter 6 measures a time until the comparison process of the comparator 5 is completed, more specifically a time until the voltage level of a detected pixel signal and the voltage level of the reference voltage RAMP intersect. In addition, the counter 6 is connected to the sense amplifier 7 and outputs the counted number (comparison time) to the sense amplifier 7.

The sense amplifier 7 converts the comparison time (counter number) input from the counter 6 into an output code corresponding thereto. Accordingly, an analog pixel signal is converted into a digital signal. In addition, the sense amplifier 7 is connected to the logic circuit 8, and the sense amplifier 7 outputs the converted output code to the logic circuit 8.

The logic circuit 8 is a control device that controls the overall operation of the solid-state imaging device 100 and a calculation processing device. In this embodiment, the logic circuit 8 controls the operation of each unit not only when a normal operation is performed but also when an adjustment process for the reference voltage RAMP is performed.

More specifically, the logic circuit 8 detects the collapse (a deviation from linearity or a variation in the dynamic range) of the waveform of the reference voltage RAMP when the process of adjusting the reference voltage RAMP is performed. Then, the logic circuit 8 determines whether or not the operating point of each size-variable NMOS transistor arranged inside the reference voltage generating circuit 9 deviates from the saturation region based on a result of the detection. In addition, the logic circuit 8 is connected to the reference voltage generating circuit 9 and the test voltage switching circuit 11 and outputs an operating point adjusting signal and a switch control signal to the reference voltage generating circuit 9 and the test voltage switching circuit 11, respectively, based on the determination result at the time of adjusting the reference voltage RAMP. Then, the logic circuit 8 controls each circuit based on such output signals. The configuration of the logic circuit 8 will be described later in detail.

The reference voltage generating circuit 9 generates the reference voltage RAMP that is used for performing A/D conversion of the pixel signal and supplies the reference voltage RAMP to the comparator 5. In this embodiment, the reference voltage generating circuit 9 generates and outputs the reference voltage RAMP not only when a normal operation is performed but also when the reference voltage RAMP is adjusted.

The reference voltage generating circuit 9 changes the size of each size-variable NMOS transistor so as to adjust the operating point such that the reference voltage generating circuit 9 operates in the saturation region based on the operating point adjusting signal that is input from the logic circuit 8 at the time of adjusting the reference voltage RAMP. A specific configuration of the reference voltage generating circuit 9 will be described later in detail.

The test voltage generating circuit 10, for example, is configured by a resistor ladder or the like and generates a control voltage corresponding to the test voltage Vt that is applied to the vertical signal line VSL at the time of adjusting the reference voltage RAMP. At this time, the test voltage generating circuit 10 generates control voltages corresponding to the test voltages Vt of various voltage levels. In addition, the test voltage generating circuit 10 is connected to the test voltage switching circuit 11 and outputs the generated control voltage to the test voltage switching circuit 11.

At this time, the test voltage generating circuit 10, first, outputs a control voltage corresponding to a test voltage Vt of a constant voltage level (reference voltage level) for a predetermined first period. Thereafter, the test voltage generating circuit 10 outputs control voltages corresponding to test voltages Vt of various voltage levels for a predetermined second period. Then, the test voltage generating circuit 10 repeats the control voltage output operation of the first and second periods while changing the voltage level of the test voltage Vt of the second period every predetermined time.

In addition, in a case where a CDS (Correlated Double Sampling) process is performed when a normal image taking operation is performed, first, the output voltage and the reference voltage RAMP are compared with each other during a signal read-out period (P-phase period) at the time of resetting a pixel. Thereafter, the output voltage and the reference voltage RAMP are compared with each other during a signal read-out period (D-phase period) at the time of detecting a pixel signal.

Thus, in this embodiment, when the process of adjusting the reference voltage RAMP is performed, the first period during which the test voltage generating circuit 10 outputs a control voltage corresponding to the test voltage Vt of the reference voltage level is associated with the P-phase period. In addition, the second period during which the test voltage generating circuit 10 outputs control voltages corresponding to the test voltages Vt of various voltage levels is associated with the D-phase period. In other words, a comparison process between the test voltage Vt and the reference voltage RAMP at the time of adjusting the reference voltage RAMP is performed similarly to a comparison process between the output voltage at the time of performing an image taking operation and the reference voltage RAMP.

However, in a case where the control voltage generated by the test voltage generating circuit 10 is changed by a predetermined change amount, commonly, the amount of change in the test voltage Vt applied to the vertical signal line VSL is not the same as the amount of change in the control voltage due to the influence of the gain of the dummy pixel 2. Accordingly, in consideration of the gain of the dummy pixel 2, the control voltage output from the test voltage generating circuit 10 is adjusted such that a test voltage Vt of a desired level is applied to the vertical signal line VSL with a desired amount of change.

The test voltage switching circuit 11 switches between a control voltage (a P-phase voltage illustrated in FIG. 4) corresponding to the test voltage Vt of the P-phase period that is output from the test voltage generating circuit 10 and a control voltage (a D-phase voltage illustrated in FIG. 4) corresponding to the test voltage Vt of the D-phase period that is output from the test voltage generating circuit 10.

[Configuration of Logic Circuit]

Figure 5:
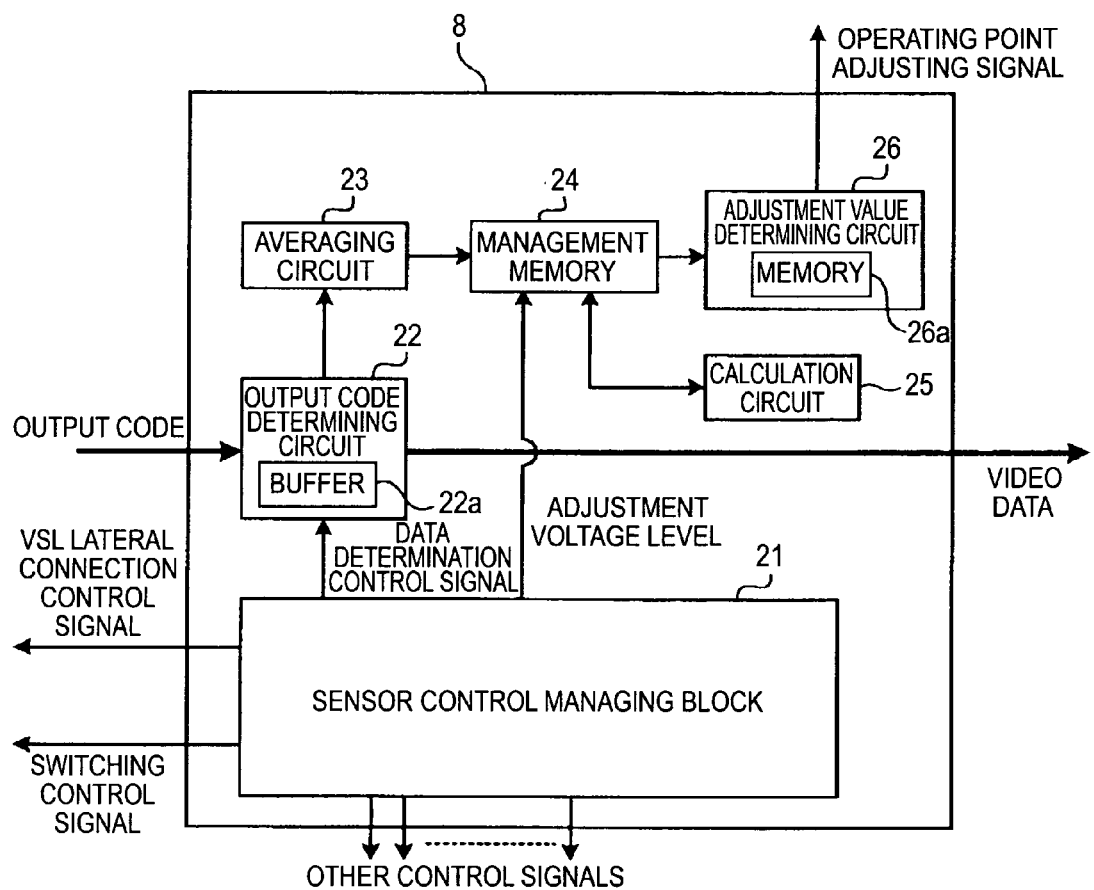
FIG. 5 is an internal block diagram illustrating the logic circuit of the solid-state imaging device according to the first embodiment.

Next, the configuration of the logic circuit 8 will be described with reference to FIG. 5. FIG. 5 is an internal block diagram illustrating the logic circuit 8 of the solid-state imaging device 100 according to this embodiment.

The logic circuit 8 includes a sensor control managing block 21, an output code determining circuit 22, an averaging circuit 23, a management memory 24, a calculation circuit 25, and an adjustment value determining circuit 26.

The sensor control managing block 21 controls the overall operation of the solid-state imaging device 100. In this embodiment, the sensor control managing block 21 controls the operation of each unit when the process of adjusting the reference voltage RAMP is performed. More specifically, the sensor control managing block 21 controls the vertical signal line lateral connection switch 4 to be turned On/Off by outputting a VSL lateral connection control signal to the vertical signal line lateral connection switch 4. In addition, the sensor control managing block 21 controls the switching operation of the test voltage switching circuit 11 by outputting a switch control signal to the test voltage switching circuit 11.

The output code determining circuit 22 is connected to the sense amplifier 7 and receives the output code from the sense amplifier 7 as an input. The output code determining circuit 22 includes a buffer 22a and temporarily stores data input from the sense amplifier 7 in the buffer. Thereafter, the output code determining circuit 22 determines whether the data input from the sense amplifier 7 is imaged data at the time of a normal imaging operation or test data at the time of adjusting the reference voltage RAMP based on a data determination control signal that is input from the sensor control managing block 21. In a case where the input data is the imaged data, the output code determining circuit 22 outputs the data as video data. On the other hand, in a case where the input data is the test data, the output code determining circuit 22 outputs the data to the averaging circuit 23.

The averaging circuit 23 calculates an average value of the test data (the output code corresponding to the test voltage Vt of the D-phase period), which is input from the output code determining circuit 22, corresponding to the number of columns. This averaging process is performed for each level of the test voltage Vt. Then, the averaging circuit 23 outputs the average value of the test data (output code) calculated for each level of the test voltage Vt to the management memory 24.

In addition, as described above, when the reference voltage RAMP is adjusted, the electric potentials (test voltages Vt) of the vertical signal lines VSL are averaged by using the vertical signal line lateral connection switches 4 disposed in each column. However, thereafter, various processes are performed for the output signal of each vertical signal line VSL by the comparator 5 and the counter 6 that are disposed in a corresponding column. Thus, there is a variation in the data output from the columns, and accordingly, in this embodiment, the influence of the variation in the test data is eliminated by arranging the averaging circuit 23. However, in a case where the variation in the test data output from the columns is small, a configuration may be employed in which the averaging circuit 23 is not arranged, and the test data of a predetermined column is output to the management memory 24 as an output code.

The management memory 24 stores the level of the output code (average value) for each level of the test voltage Vt, which is input from the averaging circuit 23, and the level of the test voltage Vt input from the sensor control managing block 21 therein. In addition, the management memory 24 stores data of ideal change characteristics (hereinafter, referred to as ideal characteristics) of the output code input from the calculation circuit 25 for the level of the test voltage Vt and the linearity error of the output code therein. At this time, such data is managed by arranging it as a management table inside the management memory 24. A specific configuration of this management table will be described later in detail.

The calculation circuit 25 calculates the ideal characteristics of the output code at the time of adjusting the reference voltage RAMP based on the value of the output code (average value) for each level of the test voltage Vt that is stored in the management memory 24. In addition, the calculation circuit 25 calculates a linearity error of the output code based on the data of the output code (average value) for each level of the test voltage Vt measured at the time of adjusting the reference voltage RAMP and data of the ideal characteristics of the calculated output code. In addition, since the linearity error has different weights (the degree of influence on the image quality of a video) on the low illuminance side and the high illuminance side, the calculation circuit 25 outputs maximum values (hereinafter, referred to as maximum linearity errors) of the linearity errors on the low illuminance side and the high illuminance side.

Then, the calculation circuit 25 outputs data of the ideal characteristics of the calculated output code, the linearity error, and the maximum linearity errors on the low illuminance side and the high illuminance side to the management memory 24. Thereafter, the calculation circuit 25 enters a sleep state. The technique for calculating the ideal characteristics of the output code and the linearity error of the output code in the calculation circuit 25 will be described later in detail.

The adjustment value determining circuit 26 acquires the maximum linearity errors of the output code on the low illuminance side and the high illuminance side, which is calculated by the calculation circuit 25, from the management memory 24. Then, the adjustment value determining circuit 26 determines the adjustment value (the adjustment amount of the size) of the operating point of each size-variable NMOS transistor arranged inside the reference voltage generating circuit 9 based on the maximum linearity errors of the output code.

At this time, the adjustment value determining circuit 26 compares each maximum linearity error with a corresponding threshold value set in advance. Then, the adjustment value determining circuit 26 determines the adjustment value of the operating point of each size-variable NMOS transistor arranged inside the reference voltage generating circuit 9 such that each maximum linearity error fits within the corresponding threshold value. Thereafter, the adjustment value determining circuit 26 outputs an operation point adjusting signal corresponding to the adjustment value to the reference voltage generating circuit 9.

In addition, the adjustment value determining circuit 26 includes a memory 26a on the inside thereof, and stores the trend of the adjustment value of the operating point in the past in the memory 26a so as to be managed. In this embodiment, the adjustment value of the operating point of the size-variable NMOS transistor arranged inside the reference voltage generating circuit 9 is determined in consideration of the trend status of the operating point as well.

In this embodiment, although an example has been described in which the function of adjusting and controlling the reference signal RAMP is provided in the logic circuit 8, the present disclosure is not limited thereto. Thus, a circuit block dedicated for adjusting and controlling the reference voltage RAMP may be separately arranged. However, it is difficult to adjust the operating point of the reference voltage generating circuit 9, for example, at the time of performing a normal image taking operation or the like, and accordingly, it is preferable that the operation of each unit at the time of adjusting the reference voltage RAMP is controlled by the logic circuit 8 that manages the operating status of the solid-state imaging device 100.

[Equivalent Image Circuit of Reference Voltage Generating Circuit]

Figure 6:
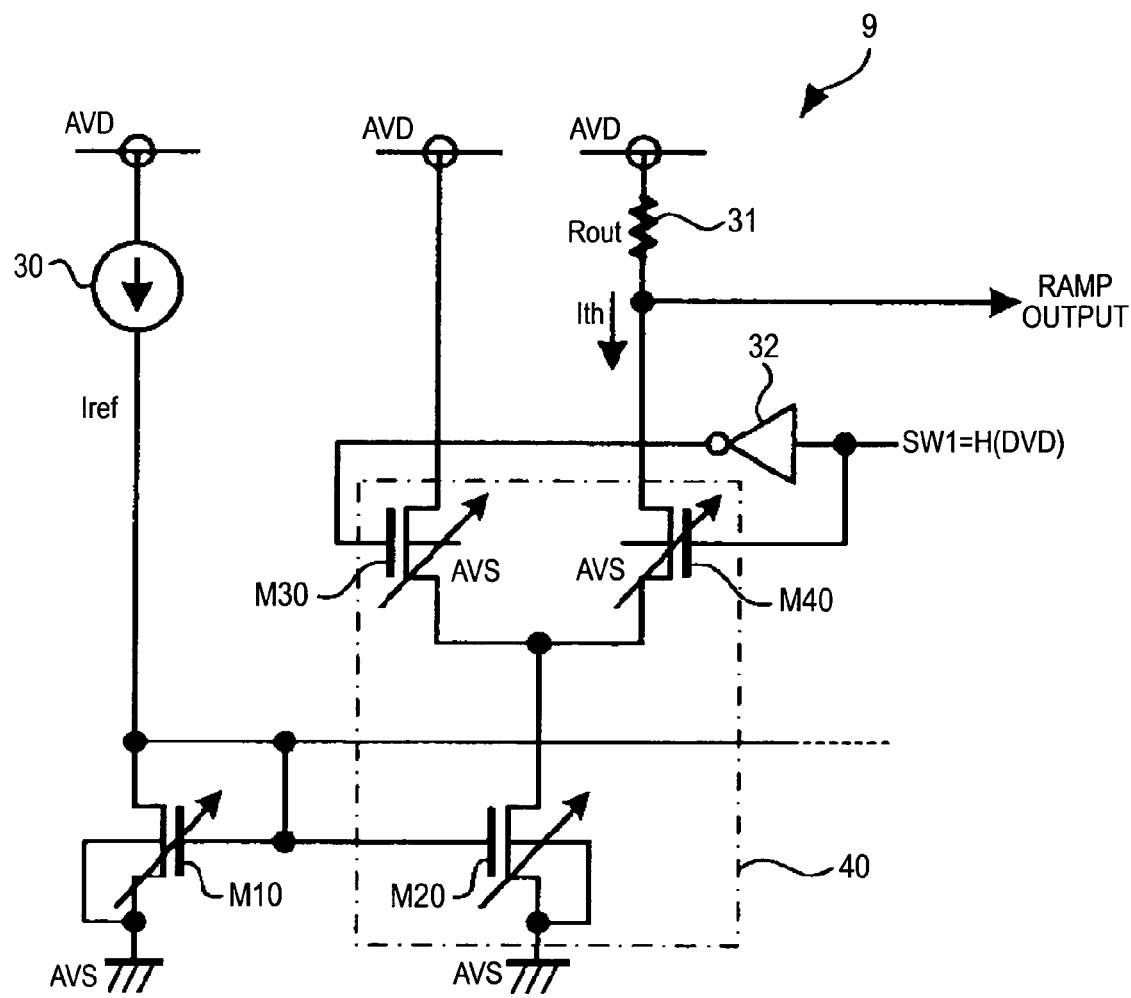
FIG. 6 is a circuit diagram of an equivalent image circuit of a reference voltage generating circuit of the solid-state imaging device according to the first embodiment.

Next, the configuration of the reference voltage generating circuit 9 according to this embodiment will be described with reference to FIG. 6. FIG. 6 is a circuit diagram of an equivalent image circuit of the reference voltage generating circuit 9. In FIG. 6, for simplification of the description, an example is illustrated in which only a first current source 40 to be described later is in the On state, and the other current sources are not illustrated.

The reference voltage generating circuit 9 includes a reference current source 30, and an output resistor 31, a first NOT circuit 32, a first size-variable NMOS transistor M10 to a fourth size-variable NMOS transistor M40 (MOS transistor). In this embodiment, the first current source 40 is configured by the second size-variable NMOS transistor M20 to the fourth size-variable NMOS transistor M40.

As is apparent by comparing the reference voltage generating circuit 9 illustrated in FIG. 6 and the reference voltage generating circuit 210 illustrated in FIG. 2, the reference voltage generating circuit 9 illustrated in FIG. 6 has a configuration acquired by replacing the NMOS transistors arranged inside the reference voltage generating circuit 210 illustrated in FIG. 2 with size-variable NMOS transistors. The other configuration is the same as that of the reference voltage generating circuit 210 illustrated in FIG. 2.

In this embodiment, the transistor sizes of the first size-variable NMOS transistor M10 to the fourth size-variable NMOS transistor M40 are changed based on the operating point adjusting signals input from the logic circuit 8. Accordingly, the operating point of each size-variable NMOS transistor arranged inside the reference voltage generating circuit 9 is automatically adjusted.

However, at this time, the sizes of the four size-variable NMOS transistors are changed at the same rate. The reason for this is that, in a case where the sizes of the four size-variable NMOS transistors are not changed at the same rate, there are problems in that the amount of the current copied to the first current source 40 by the current mirror circuit changes or the operating point of each transistor deviates from a desired position.

The size of the NMOS transistor described here represents the ratio W/L of the channel width W of the transistor to the channel length L thereof, the number of transistors that are driven in parallel, or the like. In this embodiment, as will be described with reference to an implementation circuit, which will be described later, of the reference voltage generating circuit 9, each size-variable NMOS transistor is configured by a plurality of NMOS transistors (sub NMOS transistors) that can be driven in parallel. Thus, by adjusting the number of NMOS transistor to be driven in parallel, the size of each size-variable NMOS transistor is changed.

For example, a case will be considered in which the first size-variable NMOS transistor M10 is configured by 64 NMOS transistors, and the second size-variable NMOS transistors M20 is configured by 12 NMOS transistors, in the reference voltage generating circuit 9 illustrated in FIG. 6. In addition, a case will be considered in which the third size-variable NMOS transistor M30 and the fourth size-variable NMOS transistor M40 are respectively configured by 6 NMOS transistors. Furthermore, here, the size of each size-variable NMOS transistor at a time when all the NMOS transistors are driven in parallel is assumed to be "1".

In such a condition, a case will be described in which the size of each size-variable NMOS transistor is changed to a ½. In this case, changing the channel width W of the NMOS transistor to a half and changing the number of NMOS transistors driven in parallel to a half are equivalent. Accordingly, in this case, the numbers of NMOS transistors that are driven in parallel in the first size-variable NMOS transistor M10 to the fourth size-variable NMOS transistor may be set to 32, 6, 3, and 3.

In a case where the size is set to ½ by configuring the number of NMOS transistors driven in parallel in each size-variable NMOS transistor to be a half, the mutual inductance Gm of each size-variable NMOS transistor decreases by (½)$^{1/2}$ times. In addition, in such a case, the overdrive voltage Vdsat decreases by $2^{1/2}$ times.

Thus, in this embodiment, in a condition that the current Ith flowing through the first current source 40 is low, the size of the size-variable NMOS transistor is decreased so as to secure a sufficient value of the overdrive voltage Vdsat. On the other hand, in a condition that the current Ith flowing through the first current source 40 is high, the size of each size-variable NMOS transistor is increased so as to secure a sufficient value of the saturation values margin (=Vds−Vdsat).

[Example of Circuit Implementing Reference Voltage Generating Circuit]

Figure 7:
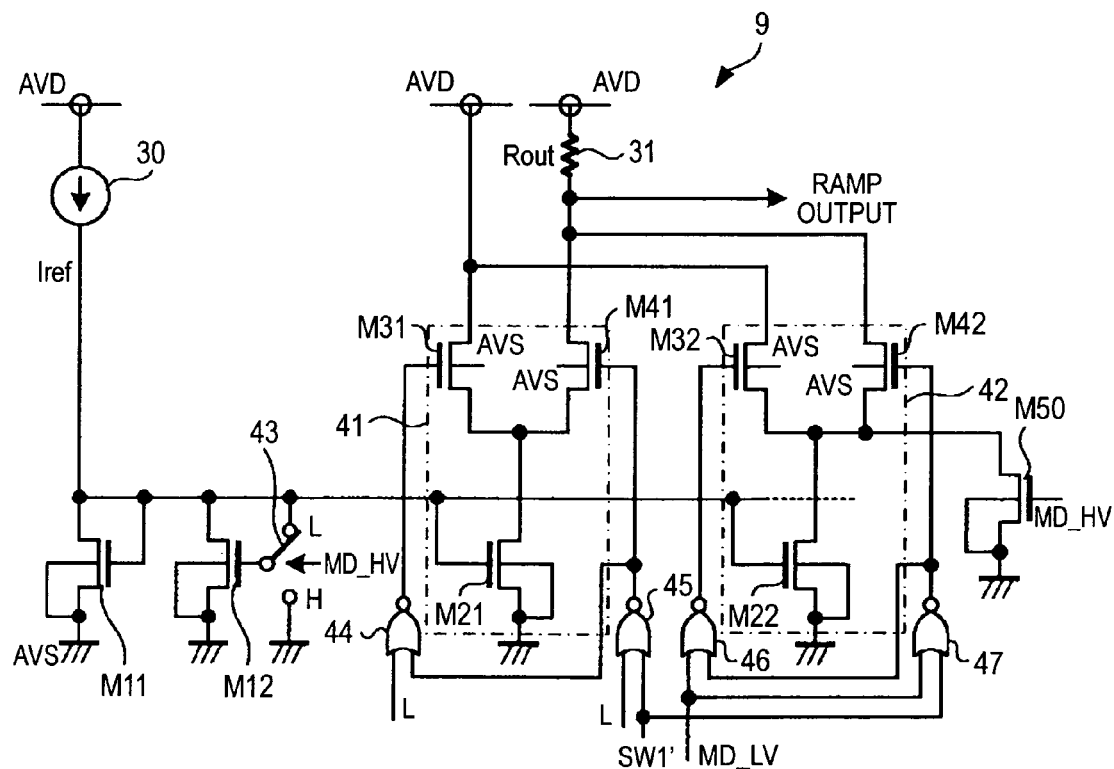
FIG. 7 is an example of an implementation circuit of the reference voltage generating circuit of the solid-state imaging device according to the first embodiment.

FIG. 7 illustrates a configuration example of an implementation circuit of the reference voltage generating circuit 9 according to this embodiment. In the reference voltage generating circuit 9 illustrated in FIG. 7, the same reference numeral is assigned to the same configuration as that of the reference voltage generating circuit 9 illustrated in FIG. 6.

As described above, each size-variable NMOS transistor arranged inside the reference voltage generating circuit 9 illustrated in FIG. 6 is configured by a plurality of NMOS transistors that can be driven in parallel, and by adjusting the number of the NMOS transistors driven in parallel, the size of the transistor is changed. More specifically, in this embodiment, each current source is configured by a plurality of sub current sources that can be driven in parallel. Then, by adjusting the number of sub current sources driven in parallel, the size of each size-variable NMOS transistor arranged inside the reference voltage generating circuit 9 is changed so as to adjust the waveform of the reference voltage RAMP. In the example illustrated in FIG. 7, an example is illustrated in which each size-variable NMOS transistor illustrated in FIG. 6 is configured by two NMOS transistors that can be driven in parallel.

The implementation circuit of the reference voltage generating circuit 9 includes a reference current source 30, an output resistor 31, a changeover switch 43, and a first NOR circuit 44 to a fourth NOR circuit 47. In addition, the reference voltage generating circuit 9 includes a first NMOS transistor M11, a second NMOS transistor M21, a third NMOS transistor M31, and a fourth NMOS transistor M41. Furthermore, the reference voltage generating circuit 9 includes a fifth NMOS transistor M12, a sixth NMOS transistor M22, a seventh NMOS transistor M32, an eighth NMOS transistor M42, and a ninth NMOS transistor M50.

In the example illustrated in FIG. 7, the first size-variable NMOS transistor M10 illustrated in FIG. 6 is configured by the first NMOS transistor M11 and the fifth NMOS transistor M12 (sub MOS transistor). In addition, the second size-variable NMOS transistor M20 illustrated in FIG. 6 is configured by the second NMOS transistor M21 and the sixth NMOS transistor M22 Furthermore, the third size-variable NMOS transistor M30 illustrated in FIG. 6 is configured by the third NMOS transistor M31 and the seventh NMOS transistor M32. In addition, the fourth size-variable NMOS transistor M40 illustrated in FIG. 6 is configured by the fourth NMOS transistor M41 and the eighth NMOS transistor M42. The connection relation on the reference current source 30 side of each circuit element is as follows.

The current inflow-side terminal of the reference current source 30 is connected to the supply terminal of the source voltage AVD, and the current outflow-side terminal of the reference current source 30 is connected to the drain terminals of the first NMOS transistor M11 and the fifth NMOS transistor M12.

The gate terminal of the first NMOS transistor M11 is connected to the gate terminals of the second NMOS transistor M21 and the sixth NMOS transistor M22, and the source terminal of the first NMOS transistor M11 is grounded (the ground voltage AVS). In addition, the gate terminal of the first NMOS transistor M11 is connected to the drain terminal thereof (forms a diode connection). Furthermore, the back bias terminal (body terminal) of the first NMOS transistor M11 is grounded.

The gate terminal of the fifth NMOS transistor M12 is connected to the changeover switch 43, and the source terminal of the fifth NMOS transistor M12 is grounded. In addition, the back bias terminal of the fifth NMOS transistor M12 is grounded.

The changeover switch 43 is controlled to be switched in accordance with a first size switching signal HD-HV and grounds the gate terminal of the fifth NMOS transistor M12 in a case where the first size switching signal HD-HV is in the "H" level. On the other hand, in a case where the first size switching signal HD-HV is in the L (Low) level, the changeover switch 43 connects the gate terminal of the fifth NMOS transistor M12 to the gate terminals of the second NMOS transistor M21 and the sixth NMOS transistor M22. Here, the first size switching signal HD-HV and a second size switching signal HD-LV to be described later are control signals that are used when the size of each size-variable NMOS transistor arranged inside the reference voltage generating circuit 9 is changed.

The drain terminal of the second NMOS transistor M21 is connected to the source terminals of the third NMOS transistor M31 and the fourth NMOS transistor M41, and the source terminal of the second NMOS transistor M21 is grounded. In addition, the back bias terminal of the second NMOS transistor M21 is grounded.

The drain terminal of the third NMOS transistor M31 is connected to the supply terminal of the source voltage AVD, and the gate terminal of the third NMOS transistor M31 is connected to the output terminal of the first NOR circuit 44. In addition, out of two input terminals of the first NOR circuit 44, one input terminal is connected to the supply terminal (not illustrated in the figure) of a "L" level signal, and the other input terminal is connected to the output terminal of the second NOR circuit 45. In addition, the back bias terminal of the third NMOS transistor M31 is grounded.

The drain terminal of the fourth NMOS transistor M41 is connected to the output terminal of the reference voltage RAMP and one terminal of the output resistor 31 (resistance value Rout). In addition, the other terminal of the output resistor 31 is connected to the supply terminal of the source voltage AVD. Furthermore, the gate terminal of the fourth NMOS transistor M41 is connected to the output terminal of the second NOR circuit 45. In addition, out of two input terminals of the second NOR circuit 45, one input terminal is connected to the supply terminal of the "L" level signal, and the other input terminal is connected to the supply terminal of a reversed phase (inverted) signal SW1' of the first switch control signal SW1. In addition, the reversed-phase signal SW1' is output from the supply terminal of the first switch control signal SW1 through an inverter (not illustrated in the figure). Furthermore, the back bias terminal of the fourth NMOS transistor M41 is grounded.

The drain terminal of the sixth NMOS transistor M22 is connected to the source terminals of the seventh NMOS transistor M32 and the eighth NMOS transistor M42, and the source terminal of the sixth NMOS transistor M22 is grounded. In addition, the back bias terminal of the sixth NMOS transistor M22 is grounded.

The drain terminal of the seventh NMOS transistor M32 is connected to the supply terminal of the source voltage AVD, and the gate terminal of the seventh NMOS transistor M32 is connected to the output terminal of the third NOR circuit 46. In addition, out of two input terminals of the third NOR circuit 46, one input terminal is connected to the supply terminal (not illustrated in the figure) of the second size switching signal HD-LV, and the other input terminal is connected to the output terminal of the fourth NOR circuit 47. Furthermore, the back bias terminal of the seventh NMOS transistor M32 is grounded.

The drain terminal of the eighth NMOS transistor M42 is connected to the output terminal of the reference voltage RAMP and one terminal of the output resistor 31. In addition, the gate terminal of the eighth NMOS transistor M42 is connected to the output terminal of the fourth NOR circuit 47. Furthermore, out of two input terminals of the fourth NOR circuit 47, one input terminal is connected to the supply terminal of the second size switching signal HD-LV. In addition, the other input terminal of the fourth NOR circuit 47 is connected to the supply terminal of the reversed phase signal SW1' of the first switch control signal SW1. Furthermore, the back bias terminal of the eighth NMOS transistor M42 is grounded.

The drain terminal of the ninth NMOS transistor M50 is connected to the source terminals of the seventh NMOS transistor M32 and the eighth NMOS transistor M42, and the source terminal of the ninth NMOS transistor M50 is grounded. In addition, the gate terminal of the ninth NMOS transistor M50 is connected to the supply terminal of the first size switching signal HD-HV.

In addition, the ninth NMOS transistor M50 is arranged so as to control the sixth NMOS transistor M22 to be turned On/Off. More specifically, when the first size switching signal HD-HV is in the "H" level, a second sub current source 42 to be described later is in the Off state, but the gate terminal of the sixth NMOS transistor M22 arranged inside the second sub current source 42 is in a state of being applied with a voltage. In such a case, a leakage current may be generated from the sixth NMOS transistor M22. Accordingly, in this embodiment, in such a case, the ninth NMOS transistor. M50 is turned On so as to allow the leakage current to flow through the ninth NMOS transistor M50, thereby suppressing the influence of the leakage current.

In the reference voltage generating circuit 9 according to this embodiment, a first sub current source 41 is configured by the second NMOS transistor M21, the third NMOS transistor M31, and the fourth NMOS transistor M41. In addition, in this embodiment, the second sub current source 42 is configured by the sixth NMOS transistor M22, the seventh NMOS transistor M32, and the eighth NMOS transistor M42. In addition, in this embodiment, the first current source 40 arranged inside the reference voltage generating circuit 9 illustrated in FIG. 6 is configured by the first sub current source 41 and the second sub current source 42.

In addition, in this embodiment, as logic blocks used for controlling the first sub current source 41 to be turned On/Off, the first NOR circuit 44 and the second NOR circuit 45 are used. In this embodiment, the third NMOS transistor M31 and the fourth NMOS transistor M41 are controlled to be turned On/Off by the first NOR circuit 44 and the second NOR circuit 45 and are controlled such that, when one is in the On state, the other is in the Off state.

In addition, in this embodiment, as logic blocks used for controlling the second sub current source 42 to be turned On/Off, the third NOR circuit 46 and the fourth NOR circuit 47 are used. In this embodiment, the seventh NMOS transistor M32 and the eighth NMOS transistor M42 are controlled to be turned On/Off by the third NOR circuit 46 and the fourth NOR circuit 47 and are controlled such that, when one is in the On state, the other is in the Off state.

Furthermore, as described later, for example, in order to decrease the size of each size-variable NMOS transistor arranged inside the reference voltage generating circuit 9, it is necessary to turn off the seventh NMOS transistor M32 and the eighth NMOS transistor M42 arranged inside the second sub current source 42 simultaneously. In this embodiment, in order to realize such control, as logic blocks used for controlling the second sub current source 42 to be turned On/Off, NOR circuits (the third NOR circuit 46 and the fourth NOR circuit 47) are used.

In addition, in this embodiment, although as logic blocks used for controlling the first sub current source 41 to be turned On/Off, similarly to the second sub current source 42, NOR circuits are used, this is for making the drive capability of the first sub current source 41 at the time of On/Off control and that of the second sub current source 42 be even.

As described above, in this embodiment, although an example has been described in which the NOR circuits are used as the logic blocks used for controlling each sub current source to be turned On/Off, the present disclosure is not limited thereto. Thus, an arbitrary block may be used, as long as it has a configuration that can be controlled similarly to controlling of changing the size of each size-variable NMOS transistor arranged inside the reference voltage generating circuit 9, which will be described later. In addition, in a case where signals used for controlling each NMOS transistor arranged inside the reference voltage generating circuit 9 to be turned On/Off can be generated by an additional external logic circuit, the NOR circuits may not be arranged. In such a case, the circuit area of the reference voltage generating circuit 9 can be decreased.

In addition, in this embodiment, the ratio between the transistor sizes of the first NMOS transistor M11 and the fifth NMOS transistor M12 to be driven in parallel is the same as that of the second NMOS transistor M21 and the sixth NMOS transistor M22 to be driven in parallel. Furthermore, the ratio between the transistor sizes of the first NMOS transistor M11 and the fifth NMOS transistor M12 to be driven in parallel is the same as that of the third NMOS transistor M31 and the seventh NMOS transistor M32 to be driven in parallel. In addition, the ratio between the transistor sizes of the first NMOS transistor M11 and the fifth NMOS transistor M12 to be driven in parallel is the same as that of the fourth NMOS transistor M41 and the eighth NMOS transistor M42 to be driven in parallel.

In other words, in this embodiment, all the size ratios between NMOS transistors (sub MOS transistors to be driven in parallel) corresponding to the first sub current source 41 and the second sub current source 42 are configured to be the same. Accordingly, even when the size of each size-variable NMOS transistor arranged inside the reference voltage generating circuit 9 is changed, the operating characteristics of the reference voltage generating circuit 9 can be unchanged.

In addition, the size ratio between NMOS transistors corresponding to a plurality of sub current sources is appropriately set, for example, in accordance with the adjustment accuracy, the adjustment range, and the like of the operating point that are necessary. In addition, in this embodiment, the sizes of the NMOS transistors corresponding to the plurality of sub current sources may be the same or different from one another.

[Operation for Changing Size of Each Size-Variable NMOS Transistor Arranged Inside Reference Voltage Generating Circuit]

Here, an operation for changing the transistor size at the time of adjusting the operating point of the reference voltage generating circuit 9 illustrated in FIG. 7 will be described. First, in the RAMP output mode (in a case where the first switch control signal SW1 is in the "H" level), case (hereinafter, referred to as a first driving status) will be considered in which both the first size switching signal HD-HV and the second size switching signal HD-LV are in the "L" level.

In the first driving status, the ninth NMOS transistor M50 is turned off, and the gate terminal of the fifth NMOS transistor M12 is connected to the drain terminal thereof so as to form a diode connection by the changeover switch 43. Accordingly, between the first and fifth NMOS transistors M11 and M12 and the second and sixth NMOS transistors M21 and M22, a current mirror circuit is configured.

In addition, in the first driving status, the output signal levels of the first NOR circuit 44 to the fourth NOR circuit 47 are "L", "H", "L", and "H". In such a case, the third NMOS transistor M31 and the seventh NMOS transistor M32 are turned off, and the fourth NMOS transistor M41 and the eighth NMOS transistor M42 are turned on. In other words, in the first driving status, both the first sub current source 41 and the second sub current source 42 are in the On state.

Next, in the first driving status, based on the result of the determination of the linearity error of the output code calculated by the logic circuit 8, in a case where it is necessary to decrease the transistor size inside the reference voltage generating circuit 9, the transistor size is decreased as follows. In such a case, in a state in which the RAMP output mode is maintained (in a state in which the first switch control signal SW1 is maintained at the "H" level), both the first size switching signal HD-HV and the second size switching signal HD-LV are set to the "H" level (hereinafter, this status is referred to as a second driving status).

In this second driving status, the ninth NMOS transistor M50 is in the On state, and the gate terminal of the fifth NMOS transistor M12 is grounded by the changeover switch 43. In the second driving status, the output signal levels of the first NOR circuit 44 to the fourth NOR circuit 47 are "L", "H", "L", and "L".

In this case, the second NMOS transistor M21 and the fourth NMOS transistor M41 are turned On, and the other NMOS transistors are turned Off. In other words, in the second driving status, the first sub current source 41 is in the On state, and the second sub current source 42 is in the Off state. In such a case, only the first sub current source 41 contributes to the generation of the reference voltage RAMP inside the reference voltage generating circuit 9, and accordingly, the number of NMOS transistors to be driven in parallel for generating the reference voltage RAMP is decreased.

As a result, in the second driving status, compared to the first driving status, the size of each size-variable NMOS transistor arranged inside the reference voltage generating circuit 9 is similarly decreased. In this embodiment, the size of each size-variable NMOS transistor arranged inside the reference voltage generating circuit 9 is changed as above.

In this embodiment, although an example has been described in which the transistor size is changed in two steps for one current source, the present disclosure is not limited thereto. For example, in a case where it is difficult to implement the condition for the specification such as the source voltage, it may be configured such that, for example, one current source is configured by three or more sub current sources, and the transistor size is changed in three or more steps. In such a case, the size of each size-variable NMOS transistor arranged inside the reference voltage generating circuit 9 can be adjusted more finely, whereby the reference voltage generating circuit 9 can operate at a more optimal operating point. However, as the number of sub current sources increases, the circuit area increases, and therefore, the upper limit of the number of sub current sources is limited by the circuit area and the layout condition.

[Principle of Adjusting Reference Voltage RAMP]

Next, the principle of adjusting the reference voltage RAMP according to this embodiment will be described. In this embodiment, by adjusting the size (operating point) of each size-variable NMOS transistor arranged inside the reference voltage generating circuit 9, the waveform of the reference voltage RAMP is adjusted.

(1) Principle of Adjusting in Case where Linearity of Reference Voltage RAMP Deteriorates As described with reference to FIG. 3, for example, in a case where low-voltage implementation of the source voltage AVD applied to the first current source 34 illustrated in FIG. 3 is made, it is difficult to secure the operating point of the fourth NMOS transistor M4 arranged inside the first current source 34. In this situation, in a case where the operating point of the fourth NMOS transistor M4 deviates from the saturation region, the waveform of the reference voltage RAMP has a curved shape, and accordingly, it is difficult to secure the linearity of the reference voltage RAMP.

Particularly, under a condition that the source voltage AVD is low, and the dynamic range (variation width) of the reference voltage RAMP is wide, an event that the operating point of the NMOS transistor deviates on the high illuminance side (full code side of the output code) may frequently occur.

Thus, in this embodiment, a deviation of the reference voltage RAMP from the linearity is detected, and the operating point (the waveform of the reference voltage RAMP) of each size-variable NMOS transistor arranged inside the reference voltage generating circuit 9 is adjusted. Particularly, a test voltage Vt is applied to the vertical signal line VSL from the dummy pixel 2 while changing the level thereof every predetermined period, and, based on the change characteristics of the output code acquired at that time with respect to the level of the test voltage Vt, the deviation of the reference voltage RAMP from the linearity is detected. Then, based on the result of the detection, the size of each size-variable NMOS transistor arranged inside the reference voltage generating circuit 9 is automatically changed, whereby the operating point is adjusted.

Figure 8:
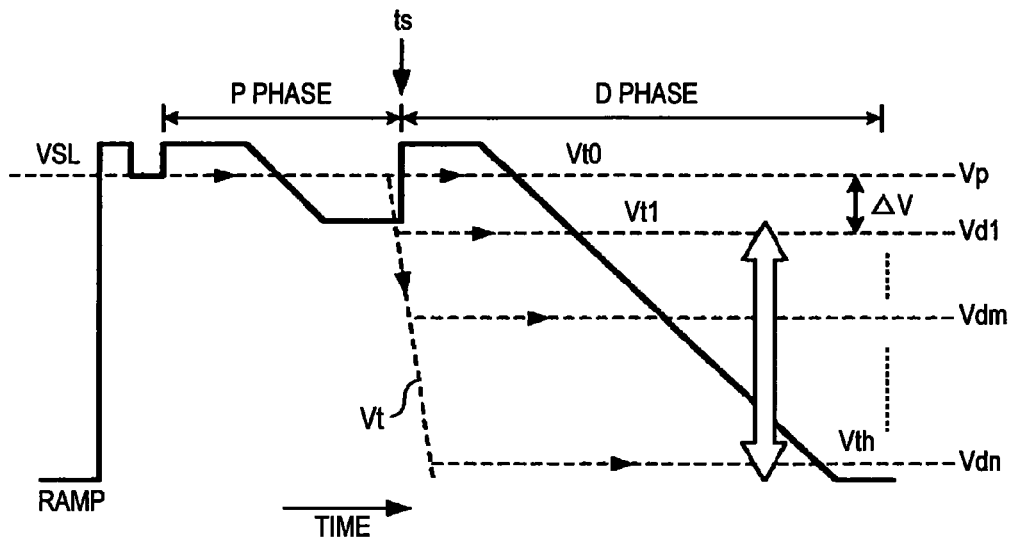
FIG. 8 is a diagram illustrating the principle of a technique (a technique for adjusting the operating points of transistors arranged inside the reference voltage generating circuit) for adjusting a reference voltage.

FIG. 8 illustrates an overview of the principle of adjusting the reference voltage RAMP in a case where the linearity of the reference voltage RAMP deteriorates. A characteristic denoted by a thick line in FIG. 8 is the signal waveform of the reference voltage RAMP that is generated by the reference voltage generating circuit 9, and here, the signal waveform of an ideal reference voltage RAMP is illustrated. A characteristic denoted by a dotted line in FIG. 8 is the signal waveform of a test voltage Vt applied to the vertical signal line VSL at the time of adjusting the operating point by the test voltage generating circuit 10 and the dummy pixel 2.

A P-phase period illustrated in FIG. 8 corresponds to a signal read-out period at the time of resetting a pixel as described above, and, during the P-phase period, the waveform of the reference voltage RAMP, generally, decreases at a predetermined inclination with respect to time. During this P-phase, the reference voltage level of the output signal is detected. In addition, a D-phase period illustrated in FIG. 8 corresponds to a signal read-out period at the time of detecting a pixel signal, and, during this D-phase period, the waveform of the reference voltage RAMP, generally, decreases at a predetermined inclination with respect to time as well. In addition, the dynamic range (variation width) of the voltage level of the reference voltage RAMP during the D-phase period is appropriately set in accordance with the number of output codes and, generally, is wider than that during the P-phase.

In this embodiment, as described above, the process of comparing the test voltage Vt and the reference voltage RAMP at the time of the adjustment process of the reference voltage RAMP is performed similarly to the process of comparing the output voltage and the reference voltage RAMP at the time of an image taking operation. Accordingly, in this embodiment, when the operating point is adjusted, first, during the P-phase period, the test voltage Vt of the reference voltage level Vp is applied to the vertical signal line VSL. Thereafter, when the period is switched to the D-phase period, the level of the test voltage Vt is set to a predetermined voltage level (one of Vp and Vd1 to Vdn illustrated in FIG. 8) and is applied to the vertical signal line VSL.

Thereafter, the process of applying the test voltage Vt during the P-phase period and the D-phase period is repeated for every predetermined time (for example, every 1 H (a read-out period for one row)) while variously changing the level of the test voltage Vt applied during the D-phase period. Then, the output code output from the sense amplifier 7 is measured at each level of the test voltage Vt. At this time, since the voltage level during the P-phase period, as described above, is used as a reference, the voltage level is set to a constant level (reference voltage level Vp) without any update.

More specifically, first, the test voltage Vt of the reference voltage level Vp is applied to the vertical signal line VSL during the P-phase period, and thereafter, also during the D-phase period, the test voltage Vt of the reference voltage level Vp is output to the vertical signal line VSL (a dotted waveform Vt0 illustrated in FIG. 8). Then, during each period, the reference voltage RAMP and the test voltage Vt are compared with each other, and an output code corresponding to the result (the counted number during each period) of the comparison is measured by the sense amplifier 7.

Thereafter, after a predetermined time elapses, the test voltage Vt of the reference voltage level Vp is output to the vertical signal line VSL during the P-phase period, and the test voltage Vt of a voltage level Vd1, which is lower than the reference voltage level Vp by ΔV, is applied to the vertical signal line VSL during the D-phase period (a dotted waveform Vt1 illustrated in FIG. 8). Then, also at this time, in each period, the reference voltage RAMP and the test voltage Vt are compared with each other, and the output code corresponding to the result of the comparison (the counted numbers during each period) is measured by the sense amplifier 7. In addition, the operation of switching between the levels of the test voltage Vt is performed at switching time is between the P-phase period and the D-phase period and is controlled to be switched by the test voltage switching circuit 11.

Thereafter, a series of operations of the applying of the above-described test voltage Vt and the measuring of the output code is repeated while lowering the level of the test voltage Vt applied to the vertical signal line VSL during the D-phase period. At this time, the value of the output code increases as the level of the test voltage Vt during the D-phase period is decreased. The series of operations of the applying of the test voltage Vt and the measuring of the output code is repeated until the level of the test voltage Vt during the D-phase period becomes a voltage level Vdn (a dotted waveform Vtn illustrated in FIG. 8) that is a voltage level when the output code is the full code (maximum value).

In addition, generally, for example, based on the performance of the solid-state imaging device 100, the dynamic range of a desired reference voltage RAMP is known in advance. Accordingly, in this embodiment, the voltage level during the D-phase period is set such that signals of the test voltage Vt during the D-phase period and the reference voltage RAMP intersect over the entirety of the dynamic range of the reference voltage RAMP.

Then, the change characteristic of the output code with respect to the change in the level of the test voltage Vt during the D-phase period that is measured as described above is stored in the management memory 24.

Thereafter, the linearity error of the output code is calculated based on the measured change characteristic of the output code, with respect to the test voltage Vt. This calculation is performed by the calculation circuit 25. In this embodiment, the linearity error is calculated by using a CDS-processed output code. The CDS process, for example, is performed by the counter 6, the logic circuit 8, and the like. In addition, by increasing the number of the values of the characteristic data by further decreasing the change width $\Delta V$ of the voltage level during the D-phase period, the calculation accuracy of the linearity error of the output code can be improved.

Figure 9:
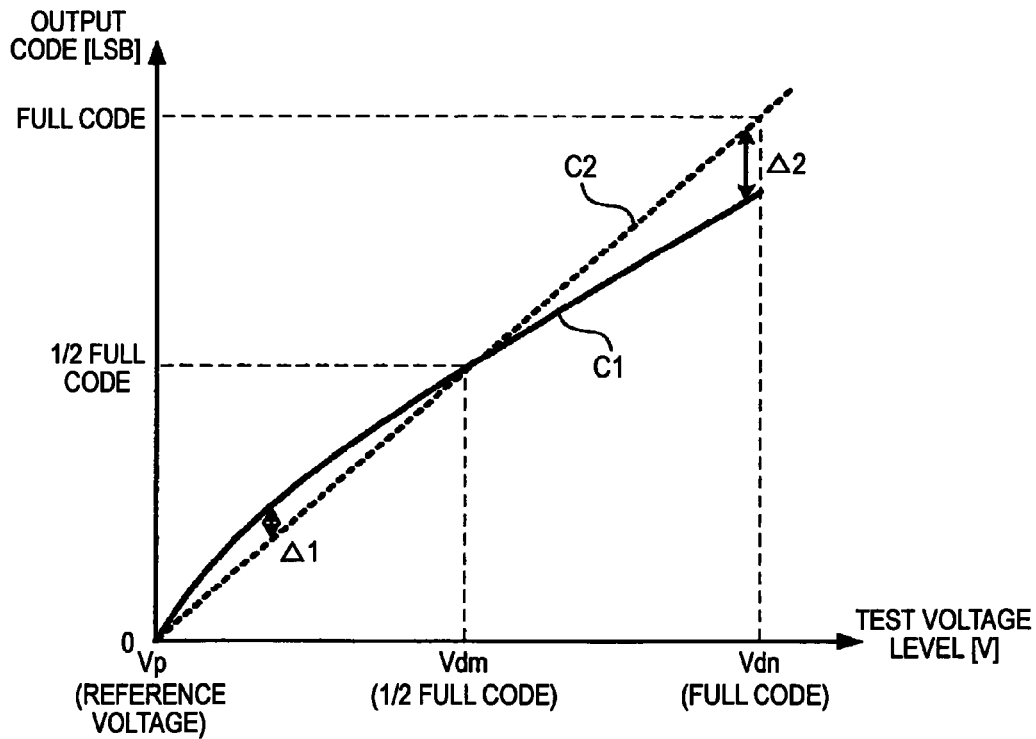
FIG. 9 is a diagram illustrating the principle of calculating a linearity error of an output code at the time of adjusting the operating point.

FIG. 9 illustrates the principle of calculating the linearity error of the output code that is calculated at the time of adjusting the operating point. In addition, FIG. 9 is a characteristic diagram representing the relation between the level of the test voltage Vt during the D-phase period, which is applied to the vertical signal line VSL, and the output code output from the sense amplifier 7. In the horizontal axis of the characteristic illustrated in FIG. 9, the horizontal axis is the voltage level of the test voltage Vt during the D-phase period, which is applied to the vertical signal line VSL, and the vertical axis is the output code that is output from the sense amplifier 7.

In a case where the operating point of each size-variable NMOS transistor arranged inside the reference voltage generating circuit 9 deviates so as not to secure the linearity of the reference voltage RAMP, the change characteristic of the output code forms a curved shape as a measurement characteristic C1 denoted by a solid line illustrated in FIG. 9, and the relation between the voltage level of the test voltage and the output code is not linear. Thus, in this embodiment, an ideal characteristic C2 (the characteristic of the dotted line illustrated in FIG. 9) of the linear shape of the output code is calculated based on the measurement characteristic C1 of the output code, a difference between the measurement characteristic C1 of the output code and the ideal characteristic C2 thereof is acquired, and the difference is regarded as the linearity error of the output code.

In addition, in a case where the operating point of each size-variable NMOS transistor arranged inside the reference voltage generating circuit 9 is in the saturation region, and the linearity of the reference voltage RAMP is secured, the change characteristic (the measurement characteristic C1) of the output code has a linear shape. Therefore, the linearity error of the output code that is calculated here represents the deviation of the reference voltage RAMP from the linearity.

In this embodiment, a line joining the measurement result (the origin of a graph illustrated in FIG. 9) at the time of applying the test voltage Vt of the reference voltage level Vp during the D-phase period and the measurement result at the time of applying the test voltage Vt of the voltage level Vdm corresponding to a half of the full code during the D-phase period is set as the ideal characteristic C2. However, a technique for calculating the ideal characteristic C2 is not limited to the technique used in this example, and an arbitrary technique can be used.

In addition, in a case where the amount of the deviation of the operating point of each size-variable NMOS transistor arranged inside the reference voltage generating circuit 9 increases, the amount of the deviation of the measurement characteristic C1 of the output code from the ideal characteristic C2 increases, whereby the linearity error of the output code increases. Accordingly, in this embodiment, it is determined whether or not the operating point of each size-variable NMOS transistor arranged inside the reference voltage generating circuit 9, that is, the size of each size-variable NMOS transistor arranged inside the reference voltage generating circuit 9 is to be changed based on the calculated linearity error.

More specifically, a maximum linearity error $\Delta 1$ on the low-illuminance side from the half full code and a maximum linearity error $\Delta 2$ on the high-illuminance side are calculated. Thereafter, the maximum linearity error $\Delta 1$ on the low illuminance side and a corresponding threshold value set in advance are compared. In addition, the maximum linearity error $\Delta 2$ on the high illuminance side and a corresponding threshold value set in advance are compared. Each threshold value corresponding to each maximum linearity error is appropriately set, for example, in accordance with the adjustment accuracy, the conversion accuracy of analog-to-digital conversion, and the like that are necessary.

Then, until both the maximum linearity error $\Delta 1$ on the low illuminance side and the maximum linearity error $\Delta 2$ on the high illuminance side are within the ranges of corresponding threshold values, in other words, until an optimal waveform of the reference voltage RAMP is acquired, the process of measuring the above-described errors and adjusting the operating point is repeated.

In a case where the linearity of the reference voltage RAMP deteriorates, as above, the operating point of each size-variable NMOS transistor arranged inside the reference voltage generating circuit 9 is adjusted, and whereby the waveform of the reference voltage RAMP is adjusted.

(2) Principle of Adjustment in Case where Dynamic Range of Reference Voltage RAMP Changes As described with reference to FIG. 3, for example, in a case where the low-voltage implementation of the source voltage DVD illustrated in FIG. 3 is made, it is difficult to secure the operating point of the second NMOS transistor M2 arranged inside the first current source 34. In such a situation, even in a case where the operating point of the second NMOS transistor M2 deviates from the saturation region, the operating point of the second NMOS transistor M2 typically deviates regardless of the level of the output code, and accordingly, the linearity of the signal waveform of the reference voltage RAMP does not deteriorate much. However, in such a case, as described above, the current Ith copied to the second NMOS transistor M2 does not have a desired value, and the dynamic range of the reference voltage RAMP varies to a large extent.

Figures 10, 11:
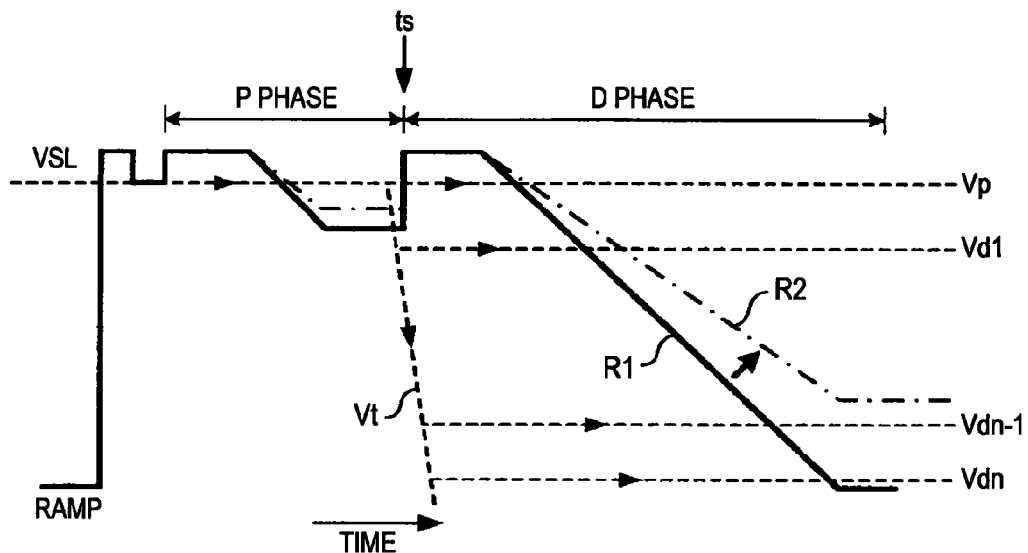
FIG. 10 is a diagram illustrating a waveform change of a reference voltage that occurs in accordance with a decrease in the source voltage.
FIG. 11 is a diagram illustrating a configuration example of a management table of the linearity error of the output code.

FIG. 10 illustrates an overview of the principle of adjusting the reference voltage RAMP when the dynamic range of the reference voltage RAMP varies. The waveform R1 of the reference voltage RAMP denoted by a thick line in FIG. 10 is a waveform in a case (at the time of a normal operation) where the reference voltage generating circuit 9 operates in the saturation region. In addition, the waveform R2 of the reference voltage RAMP denoted by a dashed-dotted line in FIG. 10 is a waveform in a case where, for example, the operating point of the second NMOS transistor M2 arranged inside the first current source 34 illustrated in FIG. 3 deviates in accordance with the low-voltage implementation of the source voltage DVD.

In a case where the operating point of the second NMOS transistor M2 arranged inside the first current source 34 illustrated in FIG. 3 deviates in accordance with a decrease in the source voltage DVD, although the waveform R2 deteriorates in a linear shape as time elapses so as not to degrade the linearity, the inclination becomes smaller than that of the waveform R1 at the time of a normal operation. As a result, the dynamic range of the reference voltage RAMP decreases.

As above, in a case where the inclination of the reference voltage RAMP is small, when the level of the test voltage Vt applied to the vertical signal line VSL is lowered every predetermined time during the D-phase period, an event occurs in which the reference voltage RAMP and the test voltage Vt do not intersect at a level equal to or lower than a specific voltage level. For example, in the example illustrated in FIG. 10, in a case where the voltage level during the D-phase period is equal to or lower than Vdn−1, the test voltage Vt and the reference voltage RAMP do not intersect. In a case where the reference voltage RAMP and the test voltage Vt do not intersect as above, the comparison time (the counted number) becomes a maximum value.

In other words, even in a case where the source voltage DVD decreases, and, for example, the operating point of the second NMOS transistor M2 illustrated in FIG. 3 deviates from the saturation region, in a range in which the voltage level of the test voltage Vt during the D-phase period is intersected by the reference voltage RAMP, the linearity of the reference voltage RAMP does not deteriorate. However, in a range in which the voltage level of the test voltage Vt during the D-phase period is not intersected by the reference voltage RAMP, the counter value as the comparison result greatly deviates.

In such a situation, when the technique for calculating the linearity error of the output code described above is used, the linearity error of the output code on the high illuminance side is large, and it can be detected that the operating point of each size-variable NMOS transistor arranged inside the reference voltage generating circuit 9 deviates. Accordingly, even in a situation that the dynamic range of the reference voltage RAMP varies in accordance with a decrease in the source voltage DVD, the above-described technique (an adjustment method that is based on the linearity error of the output code) for adjusting the operating point at a time when the linearity of the reference voltage RAMP deteriorates can be used.

[Configuration of Linearity Error Management Table]

The above-described measurement result of the linearity error of the output code is stored in the management memory 24 as a management table. FIG. 11 represents one configuration example of the management table.

In the example illustrated in FIG. 11, data of the level of the test voltage Vt at the time of adjusting the operating point, the output code output from the sense amplifier 7, the output code according to the ideal characteristic C2, the linearity error, and the maximum linearity error, and the correspondence relation thereof are stored in the management table.

In addition, in the field of "test voltage level" that is included in the management table illustrated in FIG. 11, not a measured value of the voltage applied to the vertical signal line VSL at the time of adjusting the operating point but the level of a test voltage Vt set when the control voltage is generated by the test voltage generating circuit 10 is stored. Accordingly, the data management of the linearity error can be further simplified. In addition, in the field of "output code" that is included in the management table, the value of the output code measured at the time of adjusting the operating point by using the above-described technique is stored.

Furthermore, a value (output code) written into the field of "ideal characteristic" that is included in the management table is calculated as below by using the values of the "test voltage level" and the "output code". First, the inclination of the ideal characteristic C2 is calculated by using the following equation.

Inclination=(½·Output Code At Time of Full Code)/(½·Test Voltage Level At Time of Full Code)

In the example illustrated in FIG. 11, the inclination of the ideal characteristic C2 is 90 (=900/10).

Thereafter, by integrating the calculated inclination of the ideal characteristic C2 by the voltage level written in the field of "test voltage level", the output code of the ideal characteristic C2 is calculated. Then, the calculated output code of the ideal characteristic C2 is stored in the field of "ideal characteristic" included in the management table.

In addition, the "linearity error" included in the management table is the value of a difference between the value of the field "output code" and the value of the field "ideal characteristic". Here, the inclination of the ideal characteristic C2, the output code, and the linearity error described above are calculated by the calculation circuit 25. In addition, the calculation circuit 25 acquires the maximum linearity error Δ1 on the low illuminance side and the maximum linearity error Δ2 on the high illuminance side by using the calculated linearity error and stores the acquired values in the field of the "maximum linearity error" that is included in the management table.

[Technique for Adjusting Reference Voltage RAMP]

Figure 12:
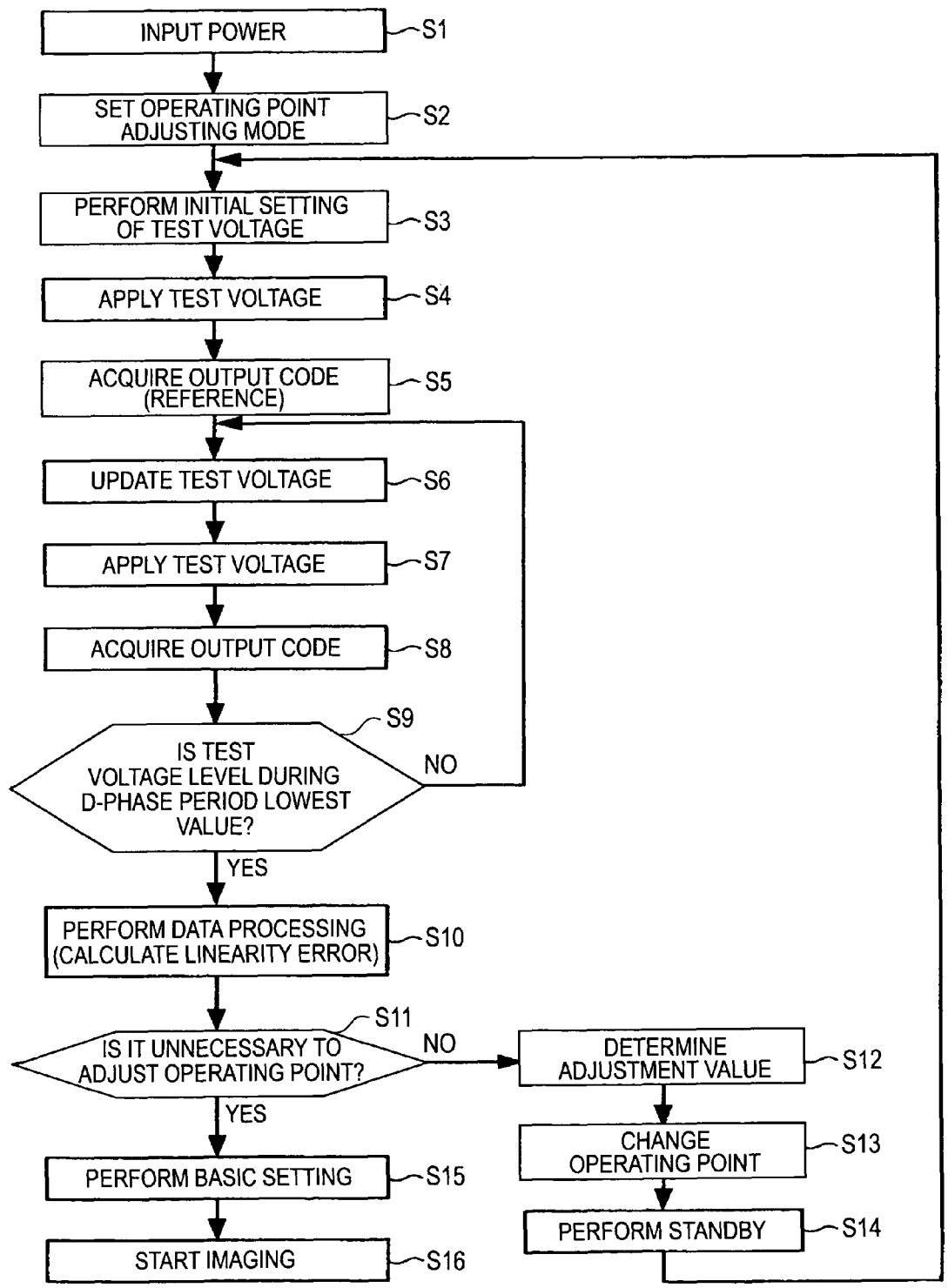
FIG. 12 is a flowchart illustrating the sequence of the process of adjusting the reference voltage (the process of adjusting the operating points of transistors arranged inside the reference voltage generating circuit) according to the first embodiment.

Next, a specific processing technique used when the reference voltage RAMP (the operating point of each size-variable NMOS transistor arranged inside the reference voltage generating circuit 9) is adjusted will be described with reference to FIG. 12. FIG. 12 is a flowchart illustrating the sequence of the process of adjusting the operating point of each size-variable NMOS transistor arranged inside the reference voltage generating circuit 9 according to this embodiment. In the example of the process described below, an example will be described in which the process of adjusting the operating point is started immediately after the input of power to the solid-state imaging device 100.

First, a user inputs power to the solid-state imaging device 100 (Step S1). Thereafter, the operation mode of the solid-state imaging device 100 is set to a mode (operating point adjusting mode) in which the test voltage Vt is applied to the vertical signal line VSL through the dummy pixel 2 (Step S2). Here, the operation of setting the operating point adjusting mode in Step S2 may be automatically performed by the solid-state imaging device 100 at the time of inputting power or may be performed by a user's predetermined operation. In Step S2, the logic circuit 8 sets the electric potentials of the vertical signal lines VSL to the same electric potential by allowing the vertical signal line lateral connection switches 4 to be in the On state.

Thereafter, the test voltage generating circuit 10 performs initial setting of the test voltage Vt to be applied to the vertical signal line VSL (Step S3). More specifically, in this embodiment, the voltage level applied to the vertical signal line VSL during the D-phase period of the reference voltage RAMP is set to the reference voltage level Vp applied during the P-phase period. In addition, the set value of the voltage level is stored in the management table of the management memory 24.

Thereafter, the dummy pixel 2 applies the test voltage Vt that is initially set to the vertical signal line VSL through the selection transistor 3 (Step S4). Then, the logic circuit 8 acquires an output code corresponding to the voltage level (the reference voltage level Vp) of the test voltage Vt during the D-phase period, which is initially set, through the sense amplifier 7 (Step S5). In addition, the value of the acquired output code is stored in the management table arranged in the management memory 24.

Thereafter, the test voltage generating circuit 10 changes (updates) the level of the test voltage Vt to be applied to the vertical signal line VSL during the D-phase period of the reference voltage RAMP (Step S6). More specifically, the voltage level during the D-phase period is decreased by a predetermined amount $\Delta V$. In addition, the value of the updated voltage level of the test voltage Vt is stored in the management table arranged in the management memory 24.

Thereafter, the dummy pixel 2 applies the updated test voltage Vt to the vertical signal line VSL through the selection transistor 3 (Step S7). Then, the logic circuit 8 acquires the output code corresponding to the updated level of the test voltage Vt during the D-phase period through the sense amplifier 7 (Step S8). In addition, the value of the acquired output code is stored in the management table arranged in the management memory 24.

In this embodiment, a series of operations of the operation of updating the level of the test voltage Vt during the D-phase period (Step S6) to the operation of acquiring the output code (Step S8) described above is performed every predetermined period (for example, for every period in which one row is read out).

Thereafter, the logic circuit 8 determines whether or not the level of the test voltage Vt during the D phase, which is updated in Step S6, is a predetermined minimum value (a voltage level corresponding to the full code) (Step S9). In other words, the logic circuit 8 determines whether or not the above-described process of Steps S6 to S8 is repeated a predetermined number of times.

In Step S9, in a case where the updated level of the test voltage Vt during the D-phase period is not the predetermined minimum value, No is determined in Step S9. In such a case, the process is returned to Step S6, and the above-described process of Steps S6 to S8 is repeated.

On the other hand, in Step S9, when the updated level of the test voltage Vt during the D-phase period reaches the predetermined minimum value, Yes is determined in Step S9. In such a case, the calculation circuit 25 calculates the linearity error of the output code based on the data repeatedly acquired in Step S8 (Step S10).

More specifically, the calculation circuit 25 calculates the ideal characteristic C2 (a dotted line characteristic illustrated in FIG. 9) of the output code based on data of levels of a plurality of test voltages Vt stored in the management table arranged in the management memory 24 and data of a plurality of output codes corresponding thereto. Then, the calculation circuit 25 calculates the linearity error and the maximum linearity errors on the low and high illuminance sides by comparing the measurement characteristic C1 of the output code and the ideal characteristic C2 thereof. Then the ideal characteristic C2 of the output code and data of various linearity errors that have been calculated are stored in the management table arranged in the management memory 24.

Thereafter, the adjustment value determining circuit 26 determines whether or not it is necessary to adjust the operating point of each size-variable NMOS transistor arranged inside the reference voltage generating circuit 9 in Step S11 based on the maximum linearity errors calculated in Step S10.

More specifically, the adjustment value determining circuit compares the maximum linearity error $\Delta 1$ on the low illuminance side and the maximum linearity error $\Delta 2$ on the high illuminance side, which are calculated in Step S10, with threshold values set for the maximum linearity errors. Then, in a case where both the maximum linearity error $\Delta 1$ on the low illuminance side and the maximum linearity error $\Delta 2$ on the high illuminance side are not values within the range of corresponding threshold values, the adjustment value determining circuit 26 determines that it is necessary to adjust the operating points.

In Step S11, in a case where the adjustment value determining circuit 26 determines that it is necessary to adjust the operating points, No is determined in Step S11. In such a case, the adjustment value determining circuit 26 determines an adjustment value (adjustment level) of the operating point based on the maximum linearity errors (Step S12). More specifically, for example, in this embodiment, the number of sub current sources driven in parallel out of a plurality of sub current sources configuring each current source arranged inside the reference voltage generating circuit 9 is determined. Thereafter, the logic circuit 8 outputs an operation point adjusting signal corresponding to the adjustment value of the operating point that is determined in Step S12 to the reference voltage generating circuit 9.

Thereafter, the reference voltage generating circuit 9 changes the operating point (size) of each size-variable NMOS transistor arranged inside the reference voltage generating circuit 9 based on the input operating point adjusting signal (Step S13). For example, in this embodiment, sub current sources corresponding to the number that corresponds to the adjustment value out of the plurality of sub current sources configuring each current source arranged inside the reference voltage generating circuit 9 are driven in parallel.

Thereafter, the solid-state imaging device 100 waits for a predetermined time until the amount of the current flowing through each current source is stabilized so as to allow the output of the reference voltage RAMP to be stabilized after the change of the operating point (Step S14). Thereafter, the process is returned to the process of Step S3. Then, the solid-state imaging device 100 repeats the process of Steps S3 to S14 while changing the operating point of each size-variable NMOS transistor arranged inside the reference voltage generating circuit 9 until each maximum linearity error fits into the range of a corresponding threshold value.

On the other hand, in a case where the adjustment value determining circuit 26 determines that it is unnecessary to adjust the operating points in Step S11, Yes is determined in Step S11. In such a case, the logic circuit 8 switches the operation mode of the solid-state imaging device 100 to the normal image taking mode and performs basic setting of the image taking mode (Step S15). Thereafter, the logic circuit 8 starts a normal taking operation (Step S16).

In this embodiment, as described above, by adjusting the operating point (size) of each size-variable NMOS transistor arranged inside the reference voltage generating circuit 9, the waveform of the reference voltage RAMP is adjusted. In addition, since the feedback process at the time of adjusting the operating points may be repeated a plurality of number of times, there is a concern that the adjustment time of the operating points is long. Therefore, the above-described operation of adjusting the operating points, as in this embodiment, is preferably performed when power is input.

As described above, in this embodiment, the operating point adjusting mode is arranged, and, in the mode, the test voltage Vt is applied to the vertical signal line VSL from the dummy pixel 2 while variously changing the voltage level during the D-phase period. Then, the size of each size-variable NMOS transistor arranged inside the reference voltage generating circuit 9 is automatically changed based on the linearity error of the output code acquired at that time. Accordingly, the operating point is adjusted such that the reference voltage generating circuit 9 operates in the saturation region, whereby a desired reference voltage RAMP is generated. In other words, in this embodiment, even in a case where the low-voltage implementation of the source voltage is made, the reference voltage RAMP having a desired waveform can be reliably generated.

In addition, in this embodiment, the linearity error of the output code is actually acquired for each solid-state imaging device 100, and the operating point of each size-variable NMOS transistor arranged inside the reference voltage generating circuit 9 is adjusted. Accordingly, in this embodiment, each size-variable NMOS transistor arranged inside the reference voltage generating circuit 9 can be typically operated at the optimal operating point, for example, without being influenced by a change of the source power, a change in the temperature, variations in the process of the solid-state imaging device 100, or the like. As a result, the waveform of the reference voltage RAMP can be typically maintained in an optimal state.

Furthermore, in this embodiment, as described above, even in a case where the low-voltage implementation of the source voltage is made, and the design specification thereof is a strict condition, the influence of the variations of the environmental conditions, the variations in the process, and the like can be cancelled, whereby the yield ratio of the solid-state imaging device 100 can be improved.

In addition, in this embodiment, as described above, the process of comparing the test voltage Vt and the reference voltage RAMP at the time of adjusting the reference voltage RAMP can be performed similarly to the process of comparing the output voltage at the time of performing the image taking operation and the reference voltage RAMP. More specifically, also at the time of adjusting the operating points, control voltages corresponding to the test voltages Vt during the P-phase period and the D-phase period are individually generated by the test voltage generating circuit 10. Furthermore, in this embodiment, the switching timing of the test voltage Vt can be arbitrarily set by the sensor control managing block 21 arranged inside the logic circuit 8. Therefore, in this embodiment, the sequence of the operating point adjusting process can be easily integrated into the normal operation of the solid-state imaging device 100, and accordingly, the process of switching between the normal image taking mode and the operating point adjusting mode can be performed in a simple manner.

3. Second Embodiment

In a second embodiment, a configuration example will be described in which the operating points are adjusted by changing a back-bias voltage applied to the back-bias terminal (body terminal) of the NMOS transistor arranged inside the reference voltage generating circuit.

In the related art, it is known that the threshold voltage Vth of a MOS transistor changes by changing the back-bias voltage of the MOS transistor. For example, in an NMOS transistor, when a positive voltage is applied to the back-bias terminal, the threshold voltage Vth decreases, and, when a negative voltage is applied, the threshold voltage Vth increases. In this embodiment, by lowering the threshold voltage Vth by utilizing the relation between the threshold voltage Vth and the back-bias voltage of the NMOS transistor, an overdrive voltage Vsat having a sufficient value is secured.

[Equivalent Image Circuit of Reference Voltage Generating Circuit]

Figure 13:
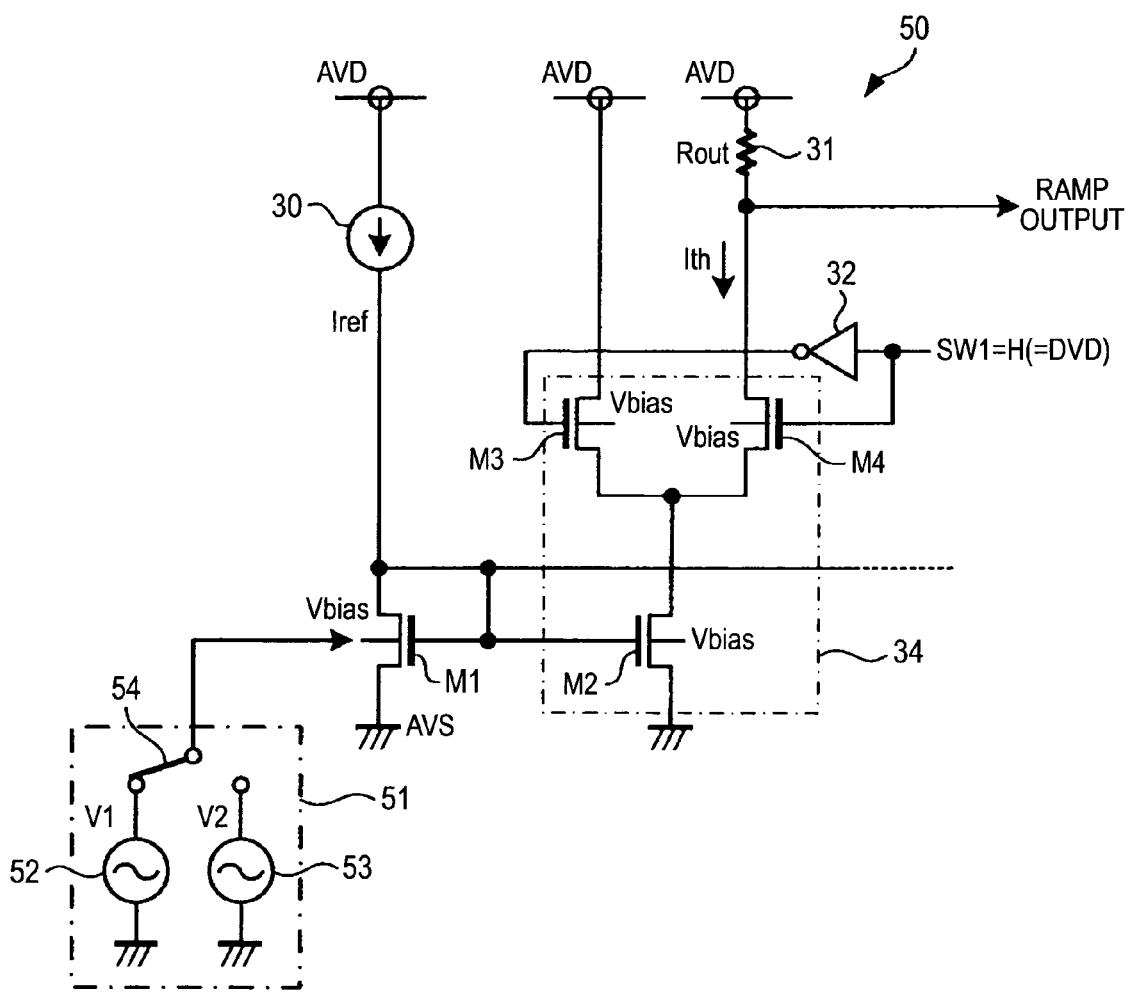
FIG. 13 is a diagram illustrating an equivalent image circuit of a reference voltage generating circuit of a solid-state imaging device according to a second embodiment.

FIG. 13 illustrates an equivalent image circuit diagram of a reference voltage generating circuit according to this embodiment. In FIG. 13, for simplification of the description, an example is illustrated in which only a first current source 34 is in the On state, and the other current sources are not illustrated. However, actually, a plurality of current sources are connected in parallel. In a reference voltage generating circuit 50 according to this embodiment illustrated in FIG. 13, the same reference numeral is assigned to the same configuration of as that of the reference voltage generating circuit 210 illustrated in FIG. 2. In addition, the entire configuration of a solid-state imaging device according to this embodiment is similar to that of the solid-state imaging device 100 according to the first embodiment illustrated in FIG. 4.

The reference voltage generating circuit 50 includes a reference current source 30, an output resistor 31, a first NOT circuit 32, a first NMOS transistor M1 to a fourth NMOS transistor M4, and a threshold value adjusting voltage generating circuit 51 (back-bias voltage generating circuit). In this embodiment, a first current source 34 is configured by the second NMOS transistor M2 to the fourth NMOS transistor M4.

In this embodiment, the configuration is substantially the same as that of the reference voltage generating circuit 210 illustrated in FIG. 2 except that the back-bias terminal of each NMOS transistor is connected to the threshold value adjusting voltage generating circuit 51. Thus, here, the configuration of the threshold value adjusting voltage generating circuit 51 will be described.

The threshold value adjusting voltage generating circuit 51 includes a plurality of bias power sources (a first bias power source 52 and a second bias power source 53) and a changeover switch 54 of bias power sources. Each bias power source is connected to the back-bias terminal of each NMOS transistor through the changeover switch 54.

In FIG. 13, although an example is illustrated in which the threshold value adjusting voltage generating circuit 51 is configured by two bias power sources including the first bias power source 52 that supplies a first bias voltage V1 and the second bias power source 53 that supplies a second bias voltage V2, the present disclosure is not limited thereto. The number of bias power sources is appropriately set, for example, in accordance with necessary adjustment accuracy or the like.

In addition, generally, it is easier to generate a positive voltage than to generate a negative voltage, and thus, in this embodiment, a positive bias voltage is generated by the threshold value adjusting voltage generating circuit 51 and is supplied to the back-bias terminal of each NMOS transistor. In other words, in this embodiment, the operating points is adjusted in a direction in which the threshold voltage Vth of each NMOS transistor is lowered. Accordingly, in this embodiment, the configuration of each NMOS transistor is adjusted in consideration of the adjustment direction of the operating point and the variation ranges of the NMOS transistors and the reference current Iref in advance. More specifically, in a condition that the threshold voltage Vth of each NMOS transistor varies in the positive direction within the variation range, and the reference current Iref flows as much as possible, the configuration of each NMOS transistor is adjusted such that the operating point at 0 V of the back-bias voltage is in the saturation region.

In a case where the reference current Iref decreases, for example, due to a process variation or the like, as described above, it is difficult to acquire a sufficient overdrive voltage Vsat (=Vgs−Vth) of each NMOS transistor. However, in this embodiment, in such a situation, by applying a positive back-bias voltage to each NMOS transistor, the threshold voltage Vth can be lowered. As a result, consequently, even in such a situation, a sufficient overdrive voltage Vsat can be secured, and whereby the operation of each NMOS transistor in the saturation region can be secured.

In addition, also in this embodiment, in an operation point adjusting process, the operation point of each NMOS transistor arranged inside the reference voltage generating circuit 50 is adjusted. At this time, it is preferable that the resolution (step width) of the back-bias voltage generated by the threshold value adjusting voltage generating circuit 51 is set to be small, and the back-bias voltage is adjusted in accordance with the variation condition of the solid-state imaging device 100 or each NMOS transistor.

[Example of Circuit Implementing Reference Voltage Generating Circuit]

Figure 14:
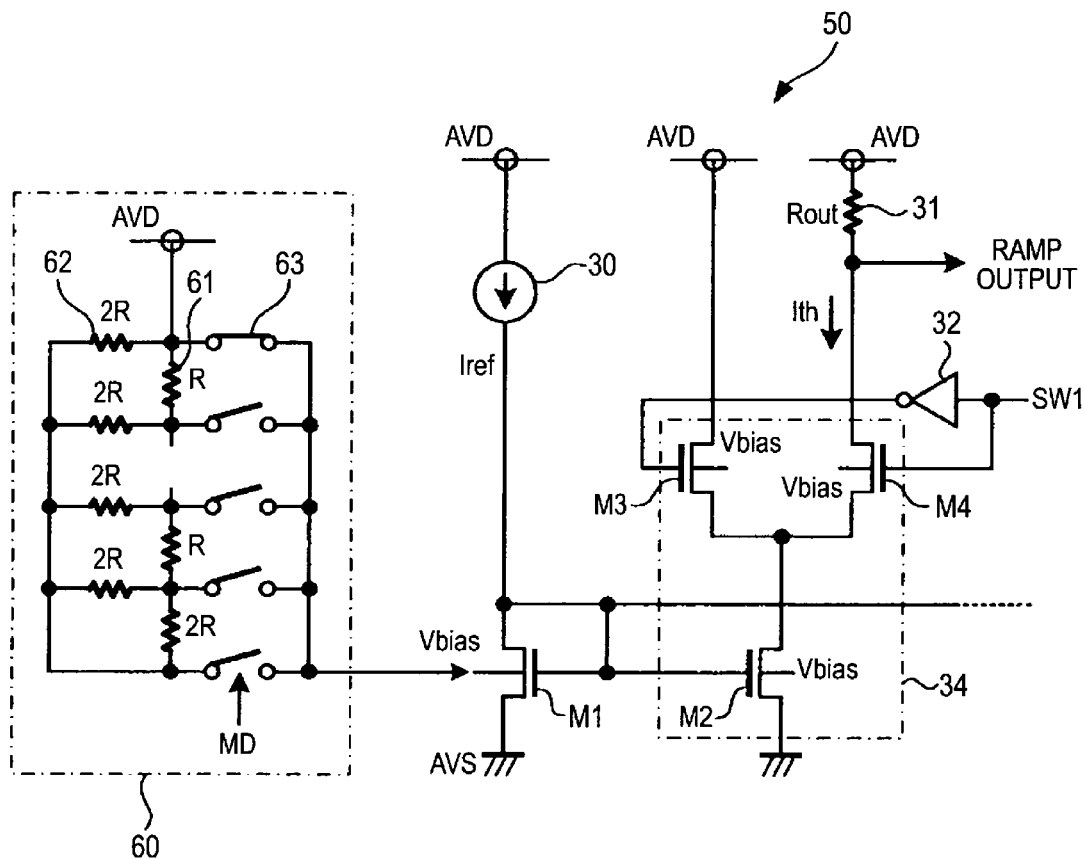
FIG. 14 is an example of an implementation circuit of the reference voltage generating circuit of the solid-state imaging device according to the second embodiment.

Here, a specific implementation example of the reference voltage generating circuit 50 according to this embodiment will be described. FIG. 14 illustrates a configuration example of an implementation circuit of the reference voltage generating circuit 50 according to this embodiment. In the reference voltage generating circuit 50 illustrated in FIG. 14, the same reference numeral is assigned to the same configuration as that of the reference voltage generating circuit 50 illustrated in FIG. 13.

Here, the configuration other than the configuration of the threshold value adjusting voltage generating circuit 60 (back-bias voltage generating circuit) is the same as that of the reference voltage generating circuit 210 described with reference to FIG. 2. Thus, here, the configuration of the threshold value adjusting voltage generating circuit 60 will be described.

The threshold value adjusting voltage generating circuit 60 includes a plurality of resistors 61 having a resistance value R, a plurality of resistors 62 having a resistance value of 2R, and a plurality of changeover switches 63. In this embodiment, a resistor array is configured by connecting the plurality of resistors 61 having a resistance value R and the plurality of resistors 62 having a resistance value 2R in a ladder pattern. In the example illustrated in FIG. 14, both ends of the resistors 61 having a resistance value R are connected to one terminal of each resistor 62 having a resistance value 2R, and the other terminals of the resistors 62 having a resistance value 2R are connected together, whereby the resistor array is configured.

In addition, in the threshold value adjusting voltage generating circuit 60, one terminal of each changeover switch 63 other than the changeover switch 63 of the final stage, which is disposed at a position farthest from the supply terminal of the source voltage AVD, is connected to a connection point between the resistor 61 having the resistance value R and the resistor 62 having the resistance value 2R. In addition, one terminal of the changeover switch 63 of the final stage is connected to the other terminal of the resistor 61, which has the resistance value 2R, of the final stage. Furthermore, the other terminal of the changeover switch 63 is connected to the output terminal of the threshold value adjusting voltage generating circuit 60.

In the threshold value adjusting voltage generating circuit 60 according to this embodiment, when the operation point is adjusted, the level of the back-bias voltage Vbias output from the threshold value adjusting voltage generating circuit 60 is adjusted by controlling the changeover switch 63 to be turned On or Off by using a control signal MD.

In addition, by increasing the number of stages of the resistor array that is formed by the resistors 61 having the resistance value R and the resistors 62 having the resistance value 2R, the back-bias voltage Vbias can be finely set, whereby each NMOS transistor can be operated at a more optimal operating point. However, the number of stages of the resistor array is limited by the circuit area of the resistors. In addition, in this embodiment, although an example is described in which the back-bias voltage Vbias is adjusted by using the resistor array, the present disclosure is not limited thereto. Thus, an arbitrary circuit can be used, as long as it has a configuration capable of adjusting the back-bias voltage Vbias.

[Technique for Adjusting Reference Voltage RAMP]

In the reference voltage generating circuit 50 according to this embodiment, a technique for adjusting the reference voltage RAMP (the operating point of each NMOS transistor arranged inside the reference voltage generating circuit 50) is similar to the technique (FIG. 12) according to the first embodiment. In other words, also in this embodiment, the test voltage Vt is applied to the vertical signal line VSL from the dummy pixel 2 while variously changing the voltage level, and the operating point is adjusted based on the linearity error of the output code for the level of the test voltage Vt that is calculated at that time.

However, in this embodiment, in the adjustment value determining process of Step S12 illustrated in FIG. 12, the logic circuit 8 determines the level of the back-bias voltage Vbias applied to each NMOS transistor based on the linearity error of the output code. Then, the logic circuit 8 outputs an operating point adjusting signal corresponding to the determined level of the back-bias voltage Vbias to the reference voltage generating circuit 50. Thereafter, in Step S13 illustrated in FIG. 12, the reference voltage generating circuit 50 controls the changeover switch 63 arranged inside the threshold value adjusting voltage generating circuit 60 to be turned On/Off based on the input operating point adjusting signal and applies the determined back-bias voltage Vbias to each NMOS transistor. The process other than Steps S12 and S13 is the same as that according to the first embodiment.

As described above, also in this embodiment, similarly to the first embodiment, the linearity error of the output code is calculated, and the operating point (the waveform of the reference voltage RAMP) of each NMOS transistor arranged inside the reference voltage generating circuit 50 is automatically adjusted based on the result of the calculation. Therefore, according to this embodiment, advantages similar to those of the first embodiment can be acquired.

4. Third Embodiment

Generally, in a solid-state imaging device including a column parallel-type AD converter, the inclination of the waveform of the reference voltage RAMP can be arbitrarily set (changed). For example, this can be realized by changing the value of the reference current Iref of the reference voltage generating circuit 210 illustrated in FIG. 2.

To such a solid-state imaging device in which the inclination of the reference voltage RAMP can be changed, the technique for adjusting the reference voltage RAMP described in the above-described first and second embodiments can be applied. In such a case, when the inclination of the reference voltage RAMP is changed, the process of adjusting the reference voltage RAMP according to the first and second embodiments is performed.

However, in such a case, when the inclination of the reference voltage RAMP is arbitrarily changed, there is a possibility that the operating point of the transistor arranged inside the reference voltage generating circuit may greatly deviate, and it may take a long time until the operating point converges to the optical operating point. In this case, when an imaging operation is performed, for example, before a stable operation of the reference voltage generating circuit is secured, there is a concern that a captured image may be affected.

Thus, in this embodiment, in a case where the inclination of the reference voltage RAMP can be changed in the solid-state imaging device, an adjustment value of the operating point at the inclination (the inclination that is initially set by an external DSP (Digital Signal Processor)) of the reference voltage RAMP of which the use frequency is high is calculated. Then, when the inclination of the reference voltage RAMP is changed, the operating point adjusting process is performed by using an adjustment value for the inclination that is the same as or closest to the inclination after change as the initial value of the adjustment of the operating point. Accordingly, the processing time for adjusting the operating point is shortened, and whereby the above-described problem can be solved. In addition, in this embodiment, the adjustment value is stored in a dedicated memory.

[Configuration of Logic Circuit]

Figures 15, 16:
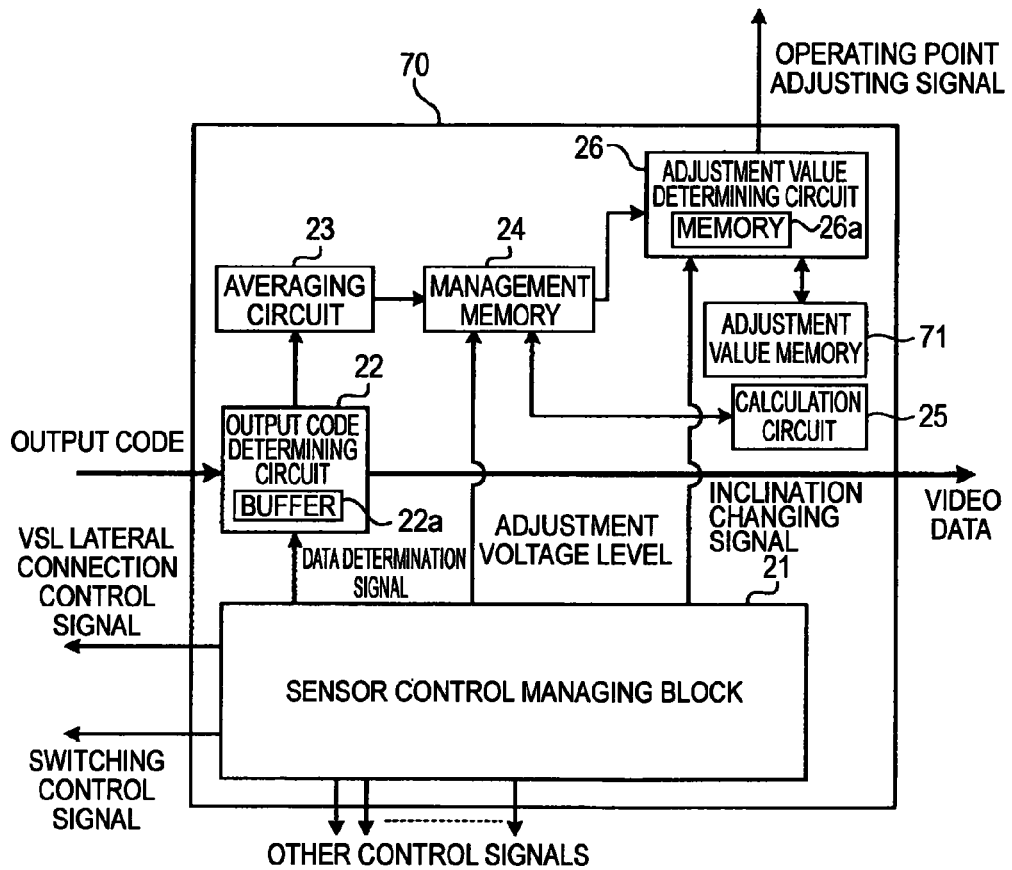
FIG. 15 is block diagram illustrating the internal logic circuit of a solid-state imaging, device according to a third embodiment.
FIG. 16 is a configuration example of an adjustment table of operation points that is used when the operating points are adjusted in the solid-state imaging device according to the third embodiment.

FIG. 15 illustrates the schematic configuration of a logic circuit arranged inside the reference voltage generating circuit of the solid-state imaging device according to this embodiment. In the logic circuit 70 illustrated in FIG. 15, the same reference numeral is assigned to the same configuration as that of the logic circuit 8 according to the first embodiment illustrated in FIG. 5. The entire configuration of the solid-state imaging device according to this embodiment is similar to that of the solid-state imaging device 100 according to the first embodiment illustrated in FIG. 4.

The logic circuit 70 includes a sensor control managing block 21, an output code determining circuit 22, an averaging circuit 23, a management memory 24, a calculation circuit 25, an adjustment value determining circuit 26, and an adjustment value memory 71 (adjustment value storing unit).

In other words, the logic circuit 70 according to this embodiment has a configuration acquired by adding the adjustment value memory 71 to the logic circuit 8 according to the first embodiment illustrated in FIG. 5. In this embodiment, the sensor control managing block 21 is connected to the adjustment value determining circuit 26, and, in the operation of changing the inclination of the reference voltage RAMP, the sensor control managing block 21 changes the inclination of the reference voltage RAMP by controlling the adjustment value determining circuit 26.

The configuration and the function other than the addition of the adjustment value memory 71 and the control of the operation of changing the inclination of the reference voltage RAMP by using the sensor control managing block 21 are similar to those of the logic circuit 8 according to the first embodiment.

The adjustment value memory 71 is a dedicated memory used for storing an adjustment value table in which each adjustment value for the inclination of the reference voltage RAMP, which has a high use frequency and is calculated in advance, is arranged. The adjustment value memory 71 is connected to the adjustment value determining circuit 26.

FIG. 16 illustrates a configuration example of an adjustment value table of operating points. In the adjustment value table, the adjustment value of the operating point for each inclination level of the reference voltage RAMP that has a high use frequency is stored. In addition, a number written into the field of "inclination level" that is arranged in the adjustment value table illustrated in FIG. 16 is the amount of change (the inclination of the waveform of the reference voltage RAMP) in the reference voltage RAMP with respect to time. In addition, a number written into the field of "operating point adjusting value" is the number of stages of the adjustment of the operating points. For example, in a system in which the operating point can be changed in a total of 12 steps, when the operating point adjusting value is "5", it represents that the amount of adjustment of the operating point is set to a fifth-step adjustment amount.

In this embodiment, as illustrated in FIG. 16, only data that represents the relation between the inclination level of the reference voltage RAMP and the operating point adjustment value is managed in the adjustment value table. For such a data amount, it is not necessary to configure the adjustment value memory 71 by using a memory having a large capacity. However, in a case where the inclination level of the reference voltage RAMP is finely managed, although the capacity of the adjustment value memory 71 is increased, the time for adjusting the operating point is further shortened.

Here, an overview of a series of the processes from the operation of changing the inclination of the reference voltage RAMP to the operation of adjusting the operating point in the logic circuit 70 according to this embodiment will be briefly described.

First, when the inclination of the reference voltage RAMP is changed, the sensor control managing block 21 outputs an inclination changing signal to the adjustment value determining circuit 26. In this inclination changing signal, information representing a specific inclination to which the inclination of the reference voltage RAMP is changed to is included.

Thereafter, the adjustment value determining circuit 26 accesses the adjustment value memory 71 based on the input inclination changing signal and acquires an adjustment value for the inclination level that is the same as or closest to the inclination level to be changed to from the adjustment value table. Then, the adjustment value determining circuit 26 outputs the acquired adjustment value of the operating point to the reference voltage generating circuit as an operating point adjusting signal.

Thereafter, the reference voltage generating circuit, similarly to those of the above-described first and second embodiments, adjusts (changes) the operating point of the transistor arranged inside the reference voltage generating circuit based on the input operating point adjusting signal.

In addition, for example, in this embodiment, the generation of the adjustment value table is performed at the time of inputting power, at a time after cancelling standby, or the like. At this time, the operating point adjusting value is calculated along the processing sequence illustrated in FIG. 12 for each inclination level of the reference voltage RAMP having a high use frequency, thereby generating the adjustment value table. The process of generating the adjustment value table performed at this time is for cancelling the manufacturing variations in the solid-state imaging devices (transistors).

In addition, when the solid-state imaging device is used, there is a possibility that the optimal value of the operating point adjusting value changes, for example, due to the influence of a change in the power source, a change in the temperature, or the like. Accordingly, it is preferable that the linearity error of the output code at the inclination level of the reference voltage RAMP having a high use frequency is calculated so as to monitor an adjustment value of the operating point, and the adjustment value table is appropriately updated. In addition, it is understood that the power source or the temperature does not rapidly changes but gently changes as the use time elapses. Accordingly, the process of updating the adjustment value table, for example, can be performed during a period such as a blanking period within 1 V imaging (an imaging process of one frame). As above, by appropriately updating the adjustment value table, the linearity of the reference voltage RAMP can be typically secured.

[Technique for Adjusting Reference Voltage RAMP]

Figure 17:
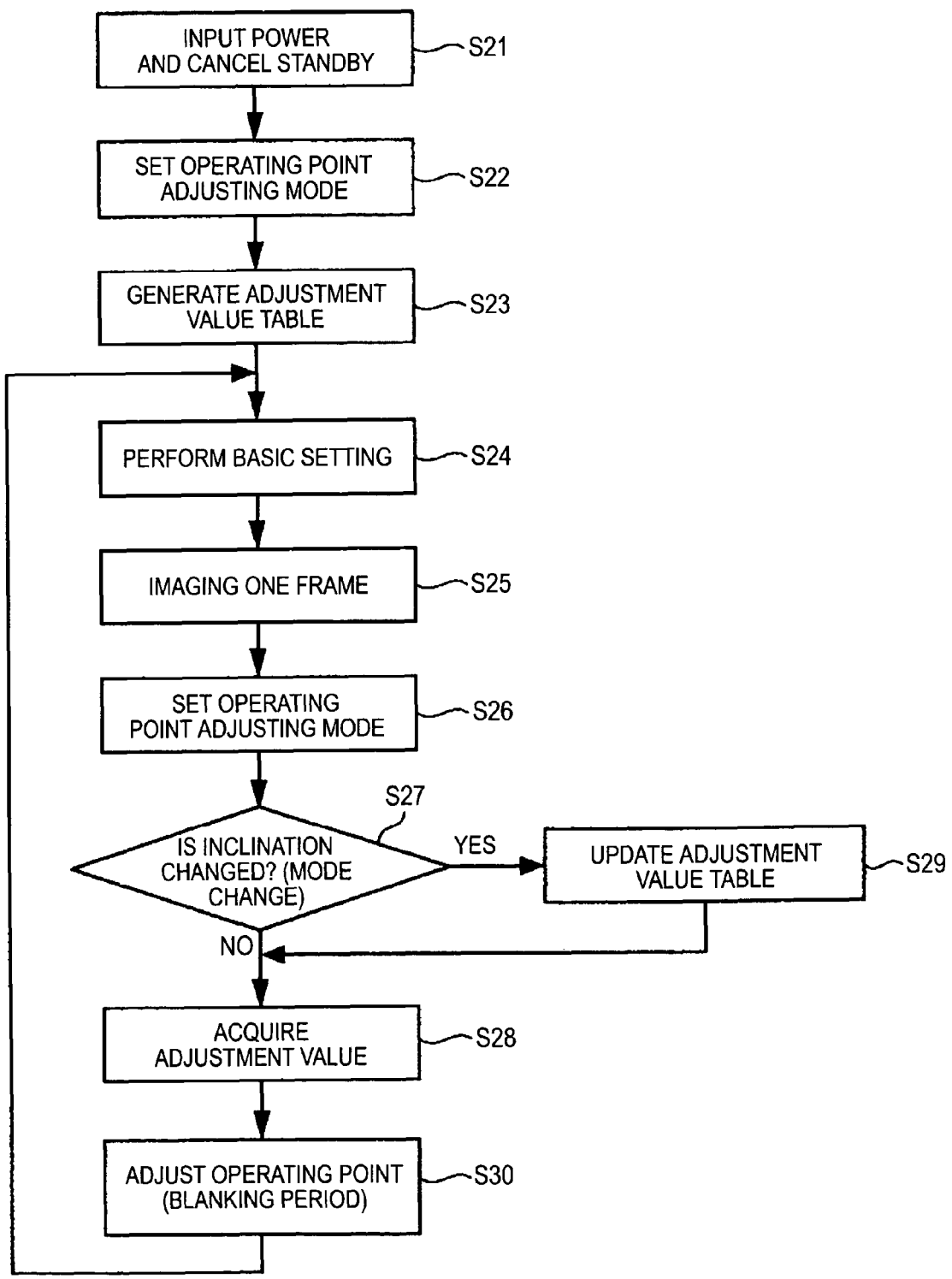
FIG. 17 is a flowchart illustrating the sequence of the process of adjusting a reference voltage (the process of adjusting the operating points of transistors arranged inside a reference voltage generating circuit) according to the third embodiment.
Figure 18:
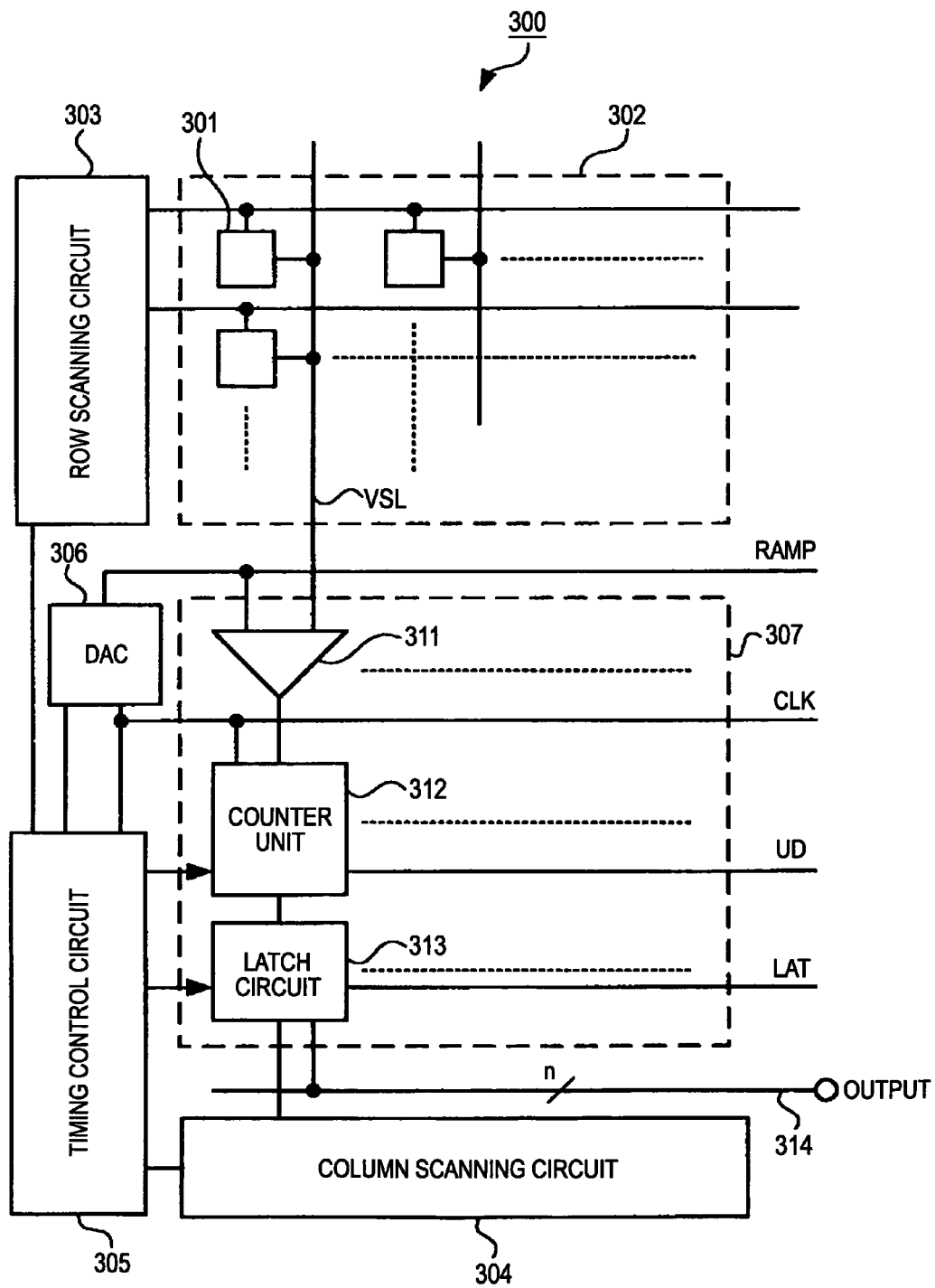
FIG. 18 is a diagram illustrating a schematic block configuration of a solid-state imaging device in the related art.

Next, a technique for adjusting a reference voltage RAMP (the operating point of each transistor arranged inside the reference voltage generating circuit) in the reference voltage generating circuit according to this embodiment will be described with reference to FIG. 17. FIG. 17 is a flowchart illustrating the sequence of the process of adjusting a reference voltage RAMP according to this embodiment.

First, a user inputs power to the solid-state imaging device or cancels a standby state (Step S21). Thereafter, the logic circuit 70 sets the operation mode of the solid-state imaging device to the operating point adjusting mode (Step S22). The operation of setting the operating point adjusting mode may be automatically performed by the solid-state imaging device or may be performed by a user's predetermined operation. In addition, in Step S22, the logic circuit 70 sets the electric potentials of the vertical signal lines VSL to the same electric potential (averaging the electric potentials) by allowing the vertical signal line lateral connection switches connected to the vertical signal lines VSL to be in the On state.

Thereafter, the logic circuit 70, in order to cancel the manufacturing variation in the solid-state imaging device (transistors), generates the adjustment value table (initial data of the adjustment value) (Step S23). More specifically, the logic circuit 70 calculates an adjustment value of the operating point along the processing sequence illustrated in FIG. 12 for each inclination level of the reference voltage RAMP having a high use frequency, thereby generating the adjustment value table (FIG. 16).

Thereafter, the logic circuit 70 switches the operation mode of the solid-state imaging device to the normal image taking mode and performs basic setting of the image taking mode (Step S24). Thereafter, the solid-state imaging device images one frame (Step S25).

Thereafter, after one frame imaging is performed, during the blanking period, the logic circuit 70 sets the operation mode of the solid-state imaging device to the operating point adjusting mode (Step S26).

Thereafter, the sensor control managing block 21 arranged inside the logic circuit 70 determines whether or not the inclination of the waveform of the reference voltage RAMP is changed (Step S27).

In Step S27, in a case where the inclination of the waveform of the reference voltage RAMP is not changed, No is determined in Step S17. In such a case, the logic circuit 70 does not update the adjustment value table. Then, the adjustment value determining circuit 26 acquires an adjustment value corresponding to an inclination level that is the same as or closest to the inclination level of the reference voltage RAMP that is currently set from the adjustment value table (Step S28). Thereafter, the adjustment value determining circuit 26 outputs an operating point adjusting signal corresponding to the acquired adjustment value of the operating point to the reference voltage generating circuit.

Thereafter, the reference voltage generating circuit, similarly to the technique for adjusting the operating point according to the first embodiment described with reference to FIG. 12, adjusts the operating point of each transistor arranged inside the reference voltage generating circuit based on the operating point adjusting signal input from the adjustment value determining circuit 26 (Step S30). Thereafter, the process is returned to Step S24, and the process is repeated from Step S24.

On the other hand, in Step S27, in a case where the inclination of the waveform of the reference voltage RAMP is changed, Yes is determined in Step S27. In such a case, the logic circuit 70 recalculates an adjustment value of the operating point along the processing sequence illustrated in FIG. 12 for each inclination level of the reference voltage RAMP having a high use frequency, thereby updating the adjustment value table (Step S28). This is for cancelling a deviation of the optimal value of the operating point adjusting value that occurs due to the influence of a change in the power source or a change in the temperature. Then, after updating the adjustment value table, the sensor control managing block 21 outputs an inclination changing signal to the adjustment value determining circuit 26.

Thereafter, the adjustment value determining circuit 26 accesses the adjustment value table based on the input inclination changing signal and acquires an adjustment value of the operating point corresponding to an inclination level that is the same as or closest to the inclination level to be changed to from the adjustment value table (Step S28). Then, the adjustment value determining circuit 26 outputs an operating point adjusting signal corresponding to the detected adjustment value of the operating point to the reference voltage generating circuit.

Thereafter, the reference voltage generating circuit, similarly to the technique for adjusting the operating point according to the first embodiment desried with reference to FIG. 12, adjusts the operating point of each transistor arranged inside the reference voltage generating circuit based on the operating point adjusting signal input from the adjustment value determining circuit 26 (Step S30). Thereafter, the process is returned to Step S24, and the process is repeated from Step S24.

In this embodiment, by automatically adjusting the operating point of each transistor arranged inside the reference voltage generating circuit as above, the reference voltage generating circuit is adjusted so as to operate in the saturation region. In addition, it takes a predetermined time for the amount of the current flowing through each current source to be stabilized after the adjustment of the operating point and the output operation (analog level) of the reference voltage RAMP to be stabilized. Accordingly, in a case where the operating point adjusting is performed during the blanking period, it is necessary to perform the operating point adjusting in consideration of a returning time (a period until a stable operation is performed after the operating point adjusting).

As described above, in this embodiment, similarly to the first embodiment, the linearity error of the output code is measured, and the operating point (the waveform of the reference voltage RAMP) of each transistor arranged inside the reference voltage generating circuit is automatically adjusted based on the result of the measurement. Therefore, according to this embodiment, advantages similar to those of the first embodiment can be acquired.

In addition, in this embodiment, an optimal operating point of the transistor arranged inside the reference voltage generating circuit can be set for each inclination of the reference voltage RAMP. Therefore, according to this embodiment, a solid-state imaging device having a large variation range of the inclination of the reference voltage RAMP can be handled, and the variation range of the inclination of the reference voltage RAMP can be set to be wider.

Furthermore, in this embodiment, the operating point adjusting value for each inclination of the reference voltage RAMP having a high use frequency is managed in the adjustment value table, and, for each change in the inclination of the reference voltage RAMP, an adjustment value for the operating point at an inclination that is the same as or closest to the inclination of the reference voltage RAMP after the change is acquired from the management table. Then, the operating point of each transistor arranged inside the reference voltage generating circuit is adjusted by using the acquired adjustment value as an initial value. Therefore, the time for adjusting the operating point at a time when the inclination of the reference voltage RAMP is changed can be further shortened.

5. Various Modified Examples

In the above-described various embodiments, although an example has been represented in which all the transistors arranged inside the reference voltage generating circuit are configured by NMOS transistors, the present disclosure is not limited thereto, and the conduction type (N type or P type) of each transistor and a combination thereof may be appropriately changed. For example, even in a case where all the transistors arranged inside the reference voltage generating circuit are configured by using PMOS (Positive-channel MOS) transistors, the present disclosure can be similarly applied, and similar advantages can be acquired.

In the above-described various embodiments, although an example has been described in which the vertical signal line VSL is arranged for each pixel row of a plurality of pixels arranged inside the pixel array unit in a matrix pattern, the present disclosure is not limited thereto. Thus, the present disclosure can be applied to a solid-state imaging device having a configuration in which one vertical signal line VSL is shared by a plurality of pixel rows, and similar advantages can be acquired.

In the above-described various embodiments, although a CMOS image sensor has been described as an example of the solid-state imaging device, the present disclosure is not limited thereto. Thus, the present disclosure can be applied to a CCD (Charge Coupled Device) image sensor, and similar advantages can be acquired.

In addition, in the above-described various embodiments, although an example has been described in which the operating point is adjusted based on the linearity error of the output code corresponding to each level of the test voltage Vt, the present disclosure is not limited thereto. For example, the operating point may be adjusted by controlling the feedback of an analog signal output to each vertical signal line VSL at the time of applying the test voltage Vt. Furthermore, in the above-described various embodiments, although an example has been described in which the linearity error of the output code is used as a parameter used for adjusting the operating point, the present disclosure is not limited thereto. Thus, an arbitrary parameter can be used, as long as it can be used for detecting the collapse of the waveform of the reference voltage RAMP.

The present disclosure contains subject matter related to that disclosed in Japanese Priority Patent Application JP 2010-254782 filed in the Japan Patent Office on Nov. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit that includes a plurality of pixels arranged two dimensionally and a plurality of read-out signal lines configured to read out pixel signals from the plurality of pixels;
   test voltage applying units that are disposed at the read-out signal lines and configured to apply test voltages of various voltage levels to the read-out signal lines;
   a reference voltage generating circuit that includes a MOS transistor, the reference voltage generating circuit configured to generate a reference voltage and to change an operating point of the MOS transistor; and
   an operating point control unit configured to control a process of adjusting the operating point of the MOS transistor based on the test voltages and the reference voltage.

2. The solid-state imaging device according to claim 1, wherein the reference voltage generating circuit is configured to change the operating point of the MOS transistor by changing a size of the MOS transistor.

3. The solid-state imaging device according to claim 2, wherein the MOS transistor is configured by a plurality of sub MOS transistors configured to be driven in parallel, and the size of the MOS transistor is changed by changing the number of the sub MOS transistors driven in parallel.

4. The solid-state imaging device according to claim 1, wherein the operating point of the MOS transistor is configured to be changed by changing a back-bias voltage applied to the MOS transistor by using the reference voltage generating circuit.

5. The solid-state imaging device according to claim 4, wherein the reference voltage generating circuit includes a back-bias voltage generating circuit configured to change the back-bias voltage applied to the MOS transistor.

6. The solid-state imaging device according to claim 1, further comprising:
   a voltage generating circuit configured to supply control voltages corresponding to the test voltages to the test voltage applying units; and
   vertical signal line connection switches configured to connect the plurality of read-out signal lines and average voltage levels applied to the read-out signal lines when the process of adjusting the operating point of the MOS transistor arranged inside the reference voltage generating circuit is performed,
   wherein the test voltage applying unit is configured by a MOS transistor, one terminal of a source terminal and a drain terminal of the MOS transistor is connected to the corresponding read-out signal line, the other terminal is connected to a source voltage, and a control voltage corresponding to the test voltage is applied to a gate terminal from the voltage generating circuit.

7. The solid-state imaging device according to claim 6, further comprising:
   a control voltage switching unit configured to switch between a first control voltage that is output during a first period from the voltage generating circuit and a second control voltage that is output during a second period after the first period,
   wherein the first period corresponds to a signal read-out period at the time of resetting the pixels, and the second period corresponds to a signal read-out period at the time of detecting signals of the pixels, and
   wherein the voltage generating circuit is configured to variously change a voltage level of the second control voltage output during the second period.

8. The solid-state imaging device according to claim 1, further comprising:
an adjustment value storing unit configured to stores data of a plurality of operating point adjustment values set for a plurality of predetermined inclinations of the reference voltage,
wherein the operating point control unit is configured to, when the inclination of the reference voltage changes, acquires the operating point adjustment value corresponding to an inclination that is the same as or closest to the inclination of the reference voltage after the change from the adjustment amount storing unit and control the process of adjusting the operating point of the MOS transistor arranged inside the reference voltage generating circuit based on the acquired operating point adjustment value.

9. The solid-state imaging device according to claim 1,
wherein the test voltage applying units are configured to apply the test voltages of various voltage levels to the read-out signal lines every predetermined time, and
wherein the operating point control unit is configured to acquires the test voltage and an output code corresponding to the test voltage that is calculated based on the reference voltage for every predetermined period, calculates a linearity error of the output code based on the acquired output code and the test voltage, and controls the process of adjusting the operating point of the MOS transistor arranged inside the reference voltage generating circuit based on a result of the calculation of the linearity error of the output code.

10. The solid-state imaging device according to claim 9, wherein the operating point control unit is configured to detect maximum linearity errors on a low illuminance side and a high illuminance side based on the result of the calculation of the linearity error of the output code and control the process of adjusting the operating point of the MOS transistor arranged inside the reference voltage generating circuit based on the maximum linearity errors on the low illuminance side and the high illuminance side.

11. A method of adjusting a reference voltage, the method comprising:
applying test voltages of various voltage levels to read-out signal lines by using test voltage applying units of a solid-state imaging device that includes a pixel array unit including a plurality of pixels arranged two dimensionally and a plurality of the read-out signal lines configured to read out pixel signals from the plurality of pixels, the test voltage applying units that are disposed at the read-out signal lines, a MOS transistor configured to generate a reference voltage, a reference voltage generating circuit configured to change an operating point of the MOS transistor, and an operating point control unit configured to control a process of adjusting the operating point of the MOS transistor arranged inside the reference voltage generating circuit;
controlling the process of adjusting the operating point of the MOS transistor based on the test voltage and the reference voltage by using the operation point control unit.

12. The method according to claim 11, wherein the reference voltage generating circuit is configured to change the operating point of the MOS transistor by changing a size of the MOS transistor.

13. The method according to claim 12, wherein the MOS transistor is configured by a plurality of sub MOS transistors configured to be driven in parallel, and the size of the MOS transistor is changed by changing the number of the sub MOS transistors driven in parallel.

14. The method according to claim 11, wherein the operating point of the MOS transistor is configured to be changed by changing a back-bias voltage applied to the MOS transistor by using the reference voltage generating circuit.

15. The method according to claim 14, wherein the reference voltage generating circuit includes a back-bias voltage generating circuit configured to change the back-bias voltage applied to the MOS transistor.

16. The method according to claim 11, further comprising:
a voltage generating circuit configured to supply control voltages corresponding to the test voltages to the test voltage applying units; and
vertical signal line connection switches configured to connect the plurality of read-out signal lines and average voltage levels applied to the read-out signal lines when the process of adjusting the operating point of the MOS transistor arranged inside the reference voltage generating circuit is performed,
wherein the test voltage applying unit is configured by a MOS transistor, one terminal of a source terminal and a drain terminal of the MOS transistor is connected to the corresponding read-out signal line, the other terminal is connected to a source voltage, and a control voltage corresponding to the test voltage is applied to a gate terminal from the voltage generating circuit.

17. The method according to claim 16, further comprising:
a control voltage switching unit configured to switch between a first control voltage that is output during a first period from the voltage generating circuit and a second control voltage that is output during a second period after the first period,
wherein the first period corresponds to a signal read-out period at the time of resetting the pixels, and the second period corresponds to a signal read-out period at the time of detecting signals of the pixels, and
wherein the voltage generating circuit is configured to variously change a voltage level of the second control voltage output during the second period.

18. The method according to claim 11, further comprising:
an adjustment value storing unit configured to store data of a plurality of operating point adjustment values set for a plurality of predetermined inclinations of the reference voltage,
wherein the operating point control unit is configured to, when the inclination of the reference voltage changes, acquire the operating point adjustment value corresponding to an inclination that is the same as or closest to the inclination of the reference voltage after the change from the adjustment amount storing unit and control the process of adjusting the operating point of the MOS transistor arranged inside the reference voltage generating circuit based on the acquired operating point adjustment value.

19. The method according to claim 11,
wherein the test voltage applying units are configured to apply the test voltages of various voltage levels to the read-out signal lines every predetermined time, and
wherein the operating point control unit is configured to acquire the test voltage and an output code corresponding to the test voltage that is calculated based on the reference voltage for every predetermined period, calculate a linearity error of the output code based on the acquired output code and the test voltage, and control the process of adjusting the operating point of the MOS transistor arranged inside the reference voltage generating circuit based on a result of the calculation of the linearity error of the output code.

20. The method according to claim 19, wherein the operating point control unit is configured to detect maximum linearity errors on a low illuminance side and a high illuminance side based on the result of the calculation of the linearity error of the output code and control the process of adjusting the operating point of the MOS transistor arranged inside the reference voltage generating circuit based on the maximum linearity errors on the low illuminance side and the high illuminance side.

* * * * *